(12) United States Patent
Smith et al.

(10) Patent No.: US 8,526,717 B2
(45) Date of Patent: Sep. 3, 2013

(54) RICH COLOR TRANSITION CURVE TRACKING METHOD

(75) Inventors: Peter Harmon Smith, Ann Arbor, MI (US); Frank Meyer, Milford, MI (US); John Frederick Cloyd, Escondido, CA (US); Bora Tekkanat, Ann Aarbor, MI (US)

(73) Assignees: Vision Interface Technologies, LLC, Ann Arbor, MI (US); Creative Lifestyles, Inc., Milford, MI (US)

( * ) Notice: Subject to any disclaimer, the term of this patent is extended or adjusted under 35 U.S.C. 154(b) by 30 days.

(21) Appl. No.: 13/301,216

(22) Filed: Nov. 21, 2011

(65) Prior Publication Data

US 2012/0076402 A1 Mar. 29, 2012

Related U.S. Application Data

(63) Continuation-in-part of application No. 12/107,092, filed on Apr. 22, 2008, now Pat. No. 8,064,691.

(60) Provisional application No. 60/917,966, filed on May 15, 2007.

(51) Int. Cl.
*G06K 9/00* (2006.01)

(52) U.S. Cl.
USPC ........... 382/162; 382/133; 382/164; 382/167; 382/190; 382/260

(58) Field of Classification Search
USPC ................. 382/133, 162, 164–167, 172, 190, 382/224, 260–264, 276–277; 348/223.1, 348/528, 645, E9.037; 358/1.13, 1.9, 3.02, 358/502–505, 515, 518, 520, 523, 525, 530
See application file for complete search history.

(56) References Cited

U.S. PATENT DOCUMENTS

| | | | |
|---|---|---|---|
| 4,302,770 A | 11/1981 | Hubbard, Jr. et al. | |
| 4,488,245 A | 12/1984 | Dalke et al. | |
| 4,520,386 A | 5/1985 | Asaida | |
| 4,901,254 A * | 2/1990 | Dolezalek et al. | 356/405 |
| 5,237,517 A | 8/1993 | Harrington et al. | |
| 5,255,350 A | 10/1993 | Hermann et al. | |
| 5,351,141 A | 9/1994 | Tsuji et al. | |
| 5,493,518 A | 2/1996 | Keating | |
| 5,751,450 A | 5/1998 | Robinson | |
| 5,867,169 A | 2/1999 | Prater | |
| 6,023,524 A | 2/2000 | Yamaguchi | |
| 6,151,405 A * | 11/2000 | Douglass et al. | 382/133 |
| 6,185,013 B1 | 2/2001 | Harrington et al. | |
| 6,226,399 B1 | 5/2001 | Robinson | |
| 6,459,501 B1 | 10/2002 | Holmes | |
| 6,574,004 B1 | 6/2003 | Jacob et al. | |
| 6,633,407 B1 | 10/2003 | Kim et al. | |
| 6,721,000 B1 | 4/2004 | Lin et al. | |
| 6,788,811 B1 | 9/2004 | Matsuura et al. | |
| 7,081,920 B2 | 7/2006 | Sugiki | |
| 7,791,649 B2 | 9/2010 | Kim et al. | |
| 2004/0114166 A1 * | 6/2004 | Kubo | 358/1.9 |
| 2005/0007608 A1 | 1/2005 | Yamamoto et al. | |
| 2008/0285848 A1 | 11/2008 | Meyer et al. | |

* cited by examiner

*Primary Examiner* — Ali Bayat
(74) *Attorney, Agent, or Firm* — Young Basile Hanlon & MacFarlane, P.C.

(57) ABSTRACT

A method of finding targets in a color image applies ratio space rich colored filtering to identify a band of pixels that form a transition zone from one rich color to another. This pixel band is reduced to a rich color transition curve. A set of transition curves with simple geometric and color properties for the entire image, can be compared to a database of target properties to identify a target in an image.

21 Claims, 23 Drawing Sheets

| RED S=1 | RED S=1 | RED S=1 | RED S=1 | Non Target Color | Non Target Color | Blue S=3 | Blue S=3 | Blue S-3 | Blue S=3 | Blue S=3 | Non Target Color | Non Target Color |

J = 113  114  115  116  117  118  119  120  121  122  123  124  125

| Green S=2 | Green S=2 | Green S=2 | Green S=2 | Green S=2 | Green S=2 | Green S=2 | Green S=2 | Green S=2 | Non Target Color | Non Target Color | Non Target Color | Non Target Color |

Line-Sets within Separation Tolerance with different Target Colors 100, 1, 103

106, 3, 110

104, 0, 105

112, 0, 113

113, 2, 121

122, 0, 125

Transition Point Data-Sets for Separation Tolerance = 4
and Target Colors or Red, Green, Blue (1, 1, 0, 0), (23, 104.3), (100,1, 103), (106, 3, 110)

| Non Target Color | RED S=1 | RED S=1 | RED S=1 | RED S=1 | Non Target Color | Non Target Color | Blue S=3 | Blue S-3 | Blue S=3 | Blue S=3 | Blue S=3 | Non Target Color |

J = 113   114   115   116   117   118   119   120   121   122   123   124   125

| Non Target Color | Green S=2 | Green S=2 | Green S=2 | Green S=2 | Green S=2 | Green S=2 | Green S=2 | Green S=2 | Green S=2 | Non Target Color | Non Target Color | Non Target Color |

Line-Sets within Separation Tolerance with different Target Colors 101, 1, 104           107, 3, 111

100, 0, 100     105, 0, 106            112, 0, 113

114, 2, 122

123, 0, 125

Transition Point Data-Sets for Separation Tolerance = 4
and Target Colors or Red, Green, Blue (3, 1, 0, 0), (24, 105.2), (101,1,104), (107, 3, 111)

(4, 2, 1, 0), (24, 112.4), (107, 3, 111), (114, 2, 122)

RICH COLOR TRANSITION CURVE TRACKING METHOD

CROSS REFERENCE TO CO-PENDING APPLICATION

This application is a continuation-in-part of co-pending U.S. patent application Ser. No. 12/107,092 filed on Apr. 22, 2008 in the names of Frank Meyer, Peter Harmon Smith and Bora Tekkanat, for a Method for Identifying Color in Machine and Computers Vision Applications, which claims priority benefit to the filing date of U.S. Provisional Patent Application Ser. No. 60/917,966, filed May 15, 2007, the contents of both of which are incorporated herein in their entirety.

BACKGROUND

The present invention relates, in general, to methods for finding targets and objects in an image.

As described in currently pending U.S. patent application Ser. No. 12/107,092 filed Apr. 22, 2008, in which the present inventors are named co-inventors, the region of interest (ROI) is the image currently being examined or possibly a subset of the image that is currently being examined. Within the ROI, the aforementioned method divides the pixels into Rich Color and non-Rich Colors. Rich Colors are further divided into Target Colors (these are limited to Rich Colors) and non-Target Colors. Target Colors are those Rich Colors that are of specific interest to the viewer at the time of examination. Rich, non-Rich, Target and non-Target Colors are reduced to binary representations, meaning that a type of color is represented as either a "1" or a "0". As described in the previous patent application, the use of configurable thresholds allows the user to simply control whether certain pixels are evaluated as target or non-target. Pixels which have been evaluated as being target pixels and that are adjacent to each other in the image are referred to as Rich Target patches. Pixels which are evaluated as being non-Target pixels can be used as a mask to restrict the area under examination reducing the amount of processing power and time required to process the ROI.

Typically, Blob analysis is used to find targets in a filtered image. Blob analysis is compute-intensive for complex images. The speed of the analysis is greatly reduced if the filtered image has image noise or a large amount of irrelevant objects. Roughly speaking, the time to process a set of blobs increase geometrically. This puts pressure on the user to better filter the image and to limit the size of the blobs to be tested such that there is an upper and lower limit to given characteristics. Further there is a need to restrict the search area to where it is most likely, i.e. near its last location. The targets also have limits as to out of plane angle that they can be tilted.

Traditionally, developers of vision systems have sought to place limits on the targets, and the operational environments to improve the odds of search procedures. However, these limits greatly reduce the usefulness of the Blob method in everyday commercial applications. Ordinary users cannot be counted on to limit the size or distance of a target. They often move a target in and out of the cameras field of view ruining any chance of limiting the search region to a small fraction of the image. Commercial applications might have one target or ten or more. The number of targets could vary from frame to frame. Commercial applications are your basic nightmare. Our method does have a drawback also. The disadvantage of this method is that it is limited to targets objects that have Rich Color patches adjacent to each other. For many commercial applications the reliability and range of use that this method gives a novice user makes it a bargain. This method can perform filtering in-line with Target detection. Commercial applications require inexpensive cameras and computing equipment that rapidly and reliably tracks in normal lighting or poorly lit rooms with uneven lighting and in the hands of novice operators with little patience.

Machine vision, commonly called automated inspection, has been used in manufacturing processes to improve productivity and quality. On a typical production line, a sensor detects a part and signals a video camera positioned above or to the side of the inspection point to capture an image and send it to a machine vision processor. Using a combination of machine vision software and hardware the vision system analyzes the image and provides mathematical answers about the part. A traditional gray scale machine vision technology makes decision based on 0-256 shades of gray. A typical vision algorithm segments an image into pixels that fall within an intensity band bounded by a lower and upper threshold from the irrelevant pixels that have intensities outside of this intensity band. Alternatively they look at the rate of change of the image pixels. Once the relevant pixels have been identified, adjacent pixels are clumped together to form blobs and these are then characterized by geometric characteristics such as location, size, shape, etc. Inspecting colored parts or objects with gray-scale machine vision systems becomes usually unreliable in many cases and impossible in others. For this reason use of a color machine vision technology is needed to inspect parts or objects in ways that could not be done using traditional gray scale machine vision systems.

Thus far, color machine vision systems have been used for three primary vision applications:

Color Matching—verifying that a certain part's or object's color matches what the vision system is programmed to find:

Color sorting—sorting parts or objects based on color.

Color Inspection—inspecting colored parts or objects for defects or imperfections that gray scale image processing tools can't detect.

Defined as the perceptual result of visible light reflected from an object to human eyes, color represents an interpretive concept. Depending on how light is reflected, all humans see colors a bit differently. Human visual system use color to draw conclusions about surfaces, boundaries, location, and relative location to other objects, orientation, movement and changes in movement of objects in a scene. The human eye is usually capable of discerning both the color of objects under inspection and discerning the Transition Curves of said objects. Both Transition Curves and colors are used in building the "scene" that the brain uses to identify what is being viewed and to then make an interpretation of the meaning of what is seen.

Machine vision systems have typically reduced color information to one of 255 colors of gray scale in order to simplify processing. An undesirable byproduct of this simplification process is often the loss of important information which often reduces the utility of the inspection.

Color derives from the spectrum of light (distribution of light energy versus wavelength) interacting in the eye with the spectral sensitivities of light receptors. Typically, a wavelength spectrum from 380 nm to 740 nm (roughly) of light is detectable by human eye. This range is known as the visible light. The pure "spectral colors" from a continuous spectrum can be divided into distinct colors: violet (~380-440 nm), blue (~440-485 nm), cyan (~485-500 nm), green (~500-565 nm), yellow (~565-590 nm), orange (~590-625 nm), and red (~625-740 nm). However, these ranges are not fixed, the division is a matter of culture, taste, and language. For instance, Newton added a seventh color, indigo, as wavelengths of 420-440 nm between blue and violet, but most people are not able to distinguish it. Of course, there are many color perceptions that by definition cannot be pure spectral colors. Some examples of non-spectral colors are the "achromatic colors" (black, gray, and white) and colors such as pink, tan, and magenta.

An additive color system involves light "emitted" from a source or illuminant of some sort such as TV or computer monitor. The additive reproduction process usually uses red, green, and blue which are the "primary colors" to produce the other colors. Combining one of these primary colors with another in equal amounts produces the "secondary colors" cyan, magenta, and yellow. Combining all three primary lights (colors) in equal intensities produces white. Varying the luminosity of each light (color) eventually reveals the full gamut of those three lights (colors).

Results obtained when mixing additive colors are often counterintuitive for people accustomed to the more everyday subtractive color system of pigments, dyes, inks, and other substances which present color to the eye by "reflection" rather than emission. Anything that is not additive color is subtractive color.

Light arriving at an opaque surface is either "reflected", "scattered", or "absorbed" or some combination of these. Opaque objects that do not reflect specularly (that is, in a manner of a mirror) have their color determined by which wavelengths of light they scatter more and which they scatter less. The light that is not scattered is absorbed. If objects scatter all wavelengths, they appear white. If they absorb all wavelengths, they appear black. Objects that transmit light are either translucent (scattering the transmitted light) or transparent (not scattering the light).

The color of an object is a complex result of its surface properties, its transmission properties, and its emission properties, all of which factors contribute to the mix of wavelengths in the light leaving the surface of an object. The perceived color is then further conditioned by the nature of the ambient illumination, and by the color properties of other objects nearby; and finally, by the permanent and transient characteristics of the perceiving eye and brain.

Light, no matter how complex its composition of wavelengths, is reduced to three color-components by the eye. For each location in the visual field, the three types of color receptor cones in the retina yield three signals based on the extent to which each is stimulated. These values are sometimes called "tristimulus values".

To analyze and process images in color, machine vision systems typically use data from color spaces such as RGB, HSI (or HSL), HSV (or HSB), CIELAB (or CIEXYZ) CMYK, etc. Individual color within each of these spaces is sometimes referred to as a color component. The original color components can be scaled individually in either a linear or non-linear fashion before proceeding with this method emphasize given target characteristics or to take compensate for lighting or camera problems or even to implement the Rich Color Filter in a more efficient fashion.

In the RGB color space, each color appears in its primary spectral components of red, green, and blue. When combined with a three-dimensional coordinate system, the RGB color space defines quantitatively any color on the spectrum. RGB uses "additive" color mixing. X-axis specifies the amount of red color, Y-axis specifies the amount of green and the Z-axis specifies amount of blue. If RGB color model is implemented in 256 (0 to 255) discrete levels of each color component (8 bits) then the color space defines a gamut of 256×256×256 or about 16.7 million colors.

The HSI color space, also known as HSL is broken down into hue, saturation and intensity or lightness. Hue refers to pure color, saturation refers to the degree or color contrast, and intensity refers to color brightness.

HSV (hue, saturation, value), also known as SHB (hue, saturation, brightness), is quite similar to HSL "brightness" replacing "lightness". Artists often use HSV color space because it is more natural to think about a color in terms of hue and saturation.

CIE 1931 XYZ color space is the first attempt to produce a color space based on measurements of human color perception. It is the most complete color space used conventionally to describe all the colors visible to human eye. It was developed by the "International Commission on Illumination" (CIE). CIE 1976 LAB is based directly on CIE 1931 XYZ color space as an attempt to make the perceptibility of color differences linear. CIE is the most accurate color space but is too complex for everyday uses.

CMYK uses subtractive color mixing in used printing process. It is possible to achieve a large range of colors seen by humans by combining cyan, magenta, and yellow transparent dyes/inks on a white substrate. Often a fourth black is added to improve reproduction of some dark colors. CMYK stores ink values for cyan, magenta, yellow, and black. There are many CMYK color spaces for different sets of inks, substrates, and press characteristics.

Although dozens of defined color spaces exist, color machine vision applications primarily have used RGB and HSI or HSV color spaces.

Prior art systems use various techniques to measure and match colors such as a color sorting method for wires by comparing the output signal of a camera to the intensity ratio of known colors until a substantial match is found.

Another technique provides a color sorting system and method used for sorting fruits and vegetables. The sorting process is handled with a look up table. The pixel value of the input image is sent to the look up table and the output from the look up table is either series of 0's (accept) or 1's (reject).

Another method for automatically and quantitatively measuring color difference between a color distribution of an object and a reference color image uses "color distance" in a color system. A template representing the reference color image is stored in a memory of a machine vision system. The machine vision system generates a sample color image of the object and processes the template together with the sample color image to obtain a total color distance.

An apparatus is known for sorting fragments of titanium-based sponge on the basis color by comparing the color values of the image to a set of data values stored in a look up table for rejection or acceptance of each fragment.

Another system and method for locating regions in a target image matches a template image with respect to color and pattern information either by using a hill-climbing technique or fuzzy logic.

A different system and method of perceptual color identification can be used for the identification and tracking of objects, for example, in a surveillance video system. The described method includes a multilevel analysis for determining the perceptual color of an object based on observed colors. This multilevel analysis can include a pixel level, a frame level, and/or a sequence level. The determination makes use of color drift matrices and trained functions such as statistical probability functions. The color drift tables and function training are based on training data generated by observing objects of known perceptual color in a variety of circumstances.

It is clear from the prior art that traditional gray scale machine vision systems are being used successfully in a wide variety of inspection and process control applications for the electronic, automotive, food products, packaging, pharmaceutical, and recycling industries.

However, the use of color machine vision systems in these industries has only been applicable to well controlled immediate environments or surroundings. As machine vision is normally practiced, it is best to have the environment controlled in order to achieve predictable, high-quality results, for example Good lighting. The lighting should be consistent across the entire area being observed, without tints or shades (so that the true color of the objects under observation could be determined). When the case at hand requires that the ROI be observed multiple times the lighting should be maintained consistently over periods of time which could vary from milliseconds to months or years.

A simple, controlled, predictable background. Most systems require that the background of the objects under inspection be controlled and known in advance. For instance, a system designed to identify defective parts worked, in part, because the system knew it was always examining the parts against the consistent background of a black conveyor belt.

Control of items that are in the immediate area where the images are being gathered. Items positioned adjacent to the imaging area, or that move into or out of the imaging area during the time the images are being captured may affect the data that is captured by the cameras. This could be due to the uncontrolled items changing the amount or quality of light that is being reflected into or being absorbed adjacent to the imaging area or the color of light being reflected into the imaging area. For instance, if a person wearing a red shirt were to walk next to an imaging area during an image capture they could introduce additional red to the data gathered and potentially change how the data is interpreted.

Cameras (or other data gathering devices) that are of high quality, good color resolution, and that will produce repeatable data under similar conditions.

The cameras should be configured correctly (as to focus, shutter speed, aperture, sensitivity etc).

The image should be captured with minimal motion blurring. This implies either that the items of interest should be held nearly motionless or that the camera(s) must be "fast" enough to capture a "frozen" image.

The orientation of the objects being examined should be known or controlled or compensated for along six axes—X, Y and Z along with roll, pitch and yaw. Lack of control of any of these, or lack of an ability to somehow determine these after the image is taken may render the image less useful. For instance, if a camera captures an image of a red box that is exactly four pixels high and four pixels wide it can make different deductions about the item depending on what it "knows" about that box. If it is known that the box is one mile away then one can reasonably estimate how tall and how wide the box is. Conversely, if it known that the box is 10 feet tall and the image is four pixels by four pixels then the system can make a reasonably accurate estimate regarding how far away the box is.

Blob analysis is the most widely used tool to find and characterize objects and targets in an image. However, Blob analysis is very slow and requires large amounts of computer memory. The more complex the image or the more filter noise the slower the search. Finally, a successful blob analysis search requires that the size of the blob in the image does not vary widely.

These limitations make it difficult to build successful applications that use color cameras to control applications on common consumer devices such as cell phones or tablets where the user is a casual user, the equipment is inexpensive and the environment is often uncontrolled. Often the more unsophisticated the user, the more demanding they are that technical products be fast, reliable, and simple to use with few if any restrictions.

It is also clear that prior art relied on matching color to a reference color image or template. A color machine and computer vision system that can make robust identification of color under varying lighting and changing image shift, scale, and rotation conditions is desirable. Machine vision systems use specialized and expensive hardware and software and therefore their use has been limited to industrial applications. With the advance of inexpensive color webcams, it is also desirable to find use for computer vision systems in cost sensitive consumer applications.

It would be desirable to provide a method to replace blob finding methods with a faster, more reliable method with fewer limitations for locating and identifying targets and objects in the field of view of a color camera in ordinary lighting environments, to thereby obviate for tracking purposes the prior art use of providing powered light sources in the target or in an illuminating source with specific directional or color characteristics.

It would also be desirable to provide a method that was so efficient that it could be implemented inside standard inexpensive cameras and that would transmit small packets of target data to a control center computer only when a target was identified.

It would also be desirable to provide an improved method of tracking objects that are tilted at extreme angles relative to the camera plane.

It would also be desirable to provide an improved method of tracking targets or objects through time or 3 dimensions.

It would also be desirable to track targets with patterns of Rich Colored patches.

It would also be desirable to provide an improved method for triggering interaction or applications between a user and computer by identifying, and locating targets or objects with Rich Colored patches in an image in the field of view of a camera or cameras.

It would also be desirable to provide an improved method for filtering such that everything in an image except for patches of different Rich Colors that were adjacent to each other was ignored.

It would be desirable to provide a machine or computer vision system that could be used in camera driven applications using ordinary smart phones, tablet computers, etc. that were fast inexpensive and reliable for unsophisticated users. It would also be desirable to provide a new method that is capable of incrementally processing a stream of data rather than requiring the processing of an entire ROI, that reduces or eliminates noise with little or no additional overhead, that discovers, assembles and stores geometric information that allows the determination of location, size, orientation, speed and acceleration of a target, and that is capable of this performance with a single target or multiple targets including tracking the position of multiple targets relative to each other within one ROI without severe degradation.

SUMMARY

A method of identifying a colored targets in an image includes the steps of processing an image sequentially one pixel at a time in each of sequentially arranged search-line;

using a computer processor to perform the steps of:

defining a ratio color space determining the largest color component value for each pixel in an image;

testing each pixel for the presence of a rich target color;

finding at least two pixels of different rich color types separated by a tolerance; and using the at least two pixels to locate target in the image.

The method also performs the steps of:

defining patches of contiguous pixels that have a common rich target color type;

finding two patches that are of two different target rich color types separated by less than an input tolerance;

for such two patches, defining a rich transition point location on the search-line at a mid-point between the two patches;

forming a transition curve by linking up all rich transition points in all search lines that are located within an input tolerance of each other with identical flanking rich target colors; and finding transition curves from the same target by searching for transition curves that share the same flanking rich target color types.

In one aspect, the method develops a color filter setting the target color indicator to a non-target color type for any pixel that has all of the original color components darker than a configurable lower threshold or all lighter than a configurable upper limit threshold. The method also develops a color filter by setting the Target Color Indicator to Black or White color type for any pixel that has all of the original color components darker than a configurable lower threshold or all lighter than a configurable upper limit threshold, respectively.

The method can repeat the process along a new search line that is perpendicular to a first search line and then combining the rich transition points with the set from the previous pass search line.

The method further develops a color filter by displaying rich target color pixel sets that were used to define a Transition point.

The method can repeat the process through a sequence of 2-D images either in time as a video or a 3-D spatial image along a search line that is perpendicular to each image and combining the transition points can form a 3-D transition surface formed by the transition points as well as 3-D transition curves.

The method uses a distance equation such that for each pixel located I, j, the color distance equation is defined as follows in terms of ratio space color component values ($c_1, c_2, \ldots c_N$):

$$A_m = POS(B_{1,m} * (f(c_1) - T_{1,m})) + POS(B_{2,m} * (f(c_2) - T_{2,m})) \ldots + POS(B_{N,m} * (f(c_N) - T_{N,m}))$$

Where, for color component n and color filter type m, $T_{n,m}$ is a color threshold, $B_{n,m}$ is the Bias, $f(c_n)$ is a function of $c_n$ and the function POS (A) such that POS (A)=0 if A is less than or equal to 0, ELSE POS (A)=A.

The method can include the step of creating a corresponding look-up-table for each rich color used in a target capturing an image and subtracting from each pixel in the image the bias of each camera color component apply the ratio space look-up-table to each pixel in the image for each primary and each secondary color used in the target to implement a color filter in this color ratio space to determine the presence of any of the N factorial rich color types that are used to identify the object or target that is being searched for.

The method uses a processor to find the location of a target within an image by searching for rich color patches adjacent to each other within a tolerance.

The method can also use more different color sensor components beyond red, green and blue.

The method can enhance poor quality data streams to emphasize rich color characteristics prior to processing.

The method can also set an indicator for each pixel that identifies the type of rich target color and the presence or the lack of a rich target color.

The method can identify pixel as having a non-Rich Color if each of its input color components is less than a black tolerance. The method of claim 1 can also identify a pixel as having a non-rich color if each of its input color components is above a white tolerance.

The method can further filter image data by limiting image data to patches of target color that flank each side of a rich color transition point.

The method also uses transition curves to identify targets in an image.

The method also uses transition curves together with database information to determine physical properties of targets in image data.

The method also uses the step of using transition curves together with database information to identify targets in multidimensional image data.

The method associates multiple adjacent curves with a given target.

The method can associate the path, and the geometric properties, the speed and the acceleration of the transition curves in a sequence of video frames to define a predefined macro or computer program or to identify a specific database entry to be used for with the macro or computer program.

In our previous patent application a method for finding Rich Colors in an image was disclosed. Among other things it defined a ratio space using the maximum component value for each pixel. This led to a distance equation in this ratio space that could be used to develop a test for the presence or absence of N factorial Rich Color types. If the number of color components N=3, then the number of Rich Color types is 6 (Red, Green, Blue, Magenta, Yellow, and Cyan). In some circumstances, black and/or white pixels are rare and, thus, worth defining as a Target color. The number of Target Color types is equal to or less than N factorial +2. Using the Rich Color distance equation, each pixel can be identified as having a Rich Color type and an associated Target Color ID value. If the pixel is not a Target Color, the Target Color ID is set to zero.

The image is processed along search-lines (rows, columns, etc.) initializing and updating a data set that is called a Rich Color Line-Set or just Line-Set defining a set of consecutive pixels all having the same Target Color ID and containing 3 pieces of data: the start pixel location of the pixel cluster, the end location, and the Target Color ID. Each time that the Target Color ID for the next pixel along the search-line is defined, it is tested to see if it has changed. If the Target Color ID is the same, then only the end location is updated to the new pixel location. If the Target Color ID has changed, a new Line-Set is defined with the location of the start and end both set to the new pixel location and the Target Color ID updated. Also, when the Target Color ID changes, begin testing for a Rich Color Transition by checking if there is the start location of the previous Line-Set is within a tolerance distance of another Line-Set further back in the current Search-line such that both have different but non-zero Target IDs. Any Line-Set further away than a distance tolerance, $T_{LD}$, is usually purged from memory to minimize memory requirements. If a Line-Set is found within the distance tolerance, $T_{LD}$, then a Transition Point Data-Set is created or updated. A Transition Point Data-Set consists of the following: a Transition Point ID number, a Transition Curve ID number, a Back-link Transition Curve number, a search-line number, a Transition Point location (X) on the search-line, a row/column indicator, the left Line-Set, and the right side Line-Set. The location X is defined by a statistical measure of the distance between the nearest start and end locations of the two Line-Sets and any non-Target pixel colors that fall between these locations. Often a simple average of the end of the left and end location of the two patches is the most common way to define x. However, sub-pixel accuracy can be obtained by using a weighted sum of the product of the pixel locations within the band extending from the end and start location mentioned above times their respective original color components all divided by the sum of these original color components. The new Transition Point can be linked up to points on the most recent search-line to find any Transition Point Data-Set located on the previous search-line that is within a distance tolerance, $T_{PD}$, and also with the same Target Colors on the same sides. If a Transition point is found that passes these tests, the new point's Transition Curve ID is set to that of the matching Transition Point-Set of the matching Transition Point-Set. If no matching Transition point is found then the Curve ID is incremented to one higher than the highest curve number.

The resulting curves together with their flanking Rich Color patches can be compared to target properties in a target database. The absolute and relative size, and orientation as well as shape and color can be used to identify, locate, and orient the targets. A sequence of images together with associated database properties can be used to determine physical properties of the objects to which the targets belong.

Rich Color filtering and the Rich Color Transition Curve detection can be combined in a compact implementation that operates on a stream of pixels occasionally sending a pixel with attending color filtering information to a second process that uses database information and previous Rich Color Transition Curve pixel data to link up Transition Curve pixels into a Rich Color Transition Curve. It is like a factory vision system that searches for rejects and then in the rare event that it finds such an object that fails to meet quality standards, a pusher pushes it into reject bin. However, in this case the rare event is finding a Rich Color Transition Curve point and instead of pushing it into a reject bin, it is sent to another process to string it together into Transition Curves and save any color and location data with it. These Transition Curves have shape, color pairs, orientation, location, and size (both relative and absolute).

By creating a set of Rich Color Transition Curves we have reduced the original problem to one of comparing a database of target properties to a small set of curves with simple geometric and color properties. The Rich Color Transition Curves can be used to detect, identify, locate, orient, and characterize a set of objects or targets. One or more of these Rich Color Transition Curves can be identified as being part of a given target. A set of such Rich Color Transition Curves can be used to characterize a target and find a target's location, and orientation (in 2D or 3D space). A sequence of video images can be used to define physical properties and further filter the data by enhancing image quality (averaging target data) for targets that have matching characteristics but possibly different location and orientation and by discarding data that cannot change properties as seen from frame to frame.

Once a target has been identified along with its geometric and other properties, these can be used with a database and a lookup table to manipulate computer interfaces, computer programs/macros, or devices. Both hardware and software implementations are disclosed. A smart camera with this method implemented in hardware could analyze each frame while the next frame is being acquired and then transmit (wired or wireless) a small data set of Rich Color Transition Curves only if a target is detected in the frame. This method requires only a few buffer memories and a very few multiples, adds, if tests and bit manipulation per pixel processed. The methods speed and flexibility make it possible to use a variety of targets at the same time. This method can be used to develop both 2D and 3D information. A sequence of video frames together with database information can be used to determine velocity, acceleration, and physics of a target object. Using targets with unique color and geometry, each target that is found can trigger a unique action based on their absolute or relative location and orientation together with their associated database properties.

To overcome these limitations related to capturing usable images for further processing, specific purpose-designed colored targets may be attached to items under investigation or known and controllable areas of an item may be specifically used as a target area (for instance a car assembly line may stop a car body under a camera at a specific point on the line with perfect lighting in order to verify that paint has been properly applied).

Purpose-designed colored targets provide unique functionality since their characteristics are known. The characteristics of a purpose designed Rich Color target may be stored in a database and made available to the image processing algorithm. The database about these targets can contain specific information such as the precise actual height and width of color patches on the target, the true colors of color blobs on the target, the relative location of Rich Color patches on the target, the relative location of multiple color patches on the target relative to all other color patches on the target, and information about Rich Color Transition Curves and boundaries on the color target including the length, position, absolute angles and relative angles of a Transition Curves to other Transition Curves and color patches on the target.

Targets, once located, can be used to trigger other actions. The mere presence or absence of a certain target, the orientation of that target, the movement pattern of that target, the speed of that target, or the acceleration or deceleration of the target may be used to trigger an action, program macro or some other external event.

BRIEF DESCRIPTION OF THE DRAWING

The various features, advantages and other uses of the present invention will become more apparent by referring to the following detailed description and drawing in which:

FIG. 9-19 are pictorial representations illustrating the progressive results of the processing steps of the Rich Color Transition Curve method from an original image with multiple objects and targets with color components to a single sought after target;

FIGS. 22 and 23 are pictorial representations showing examples of data sets used to fine transition points, build transition curves, and find targets.

DETAILED DESCRIPTION

Figure 1:
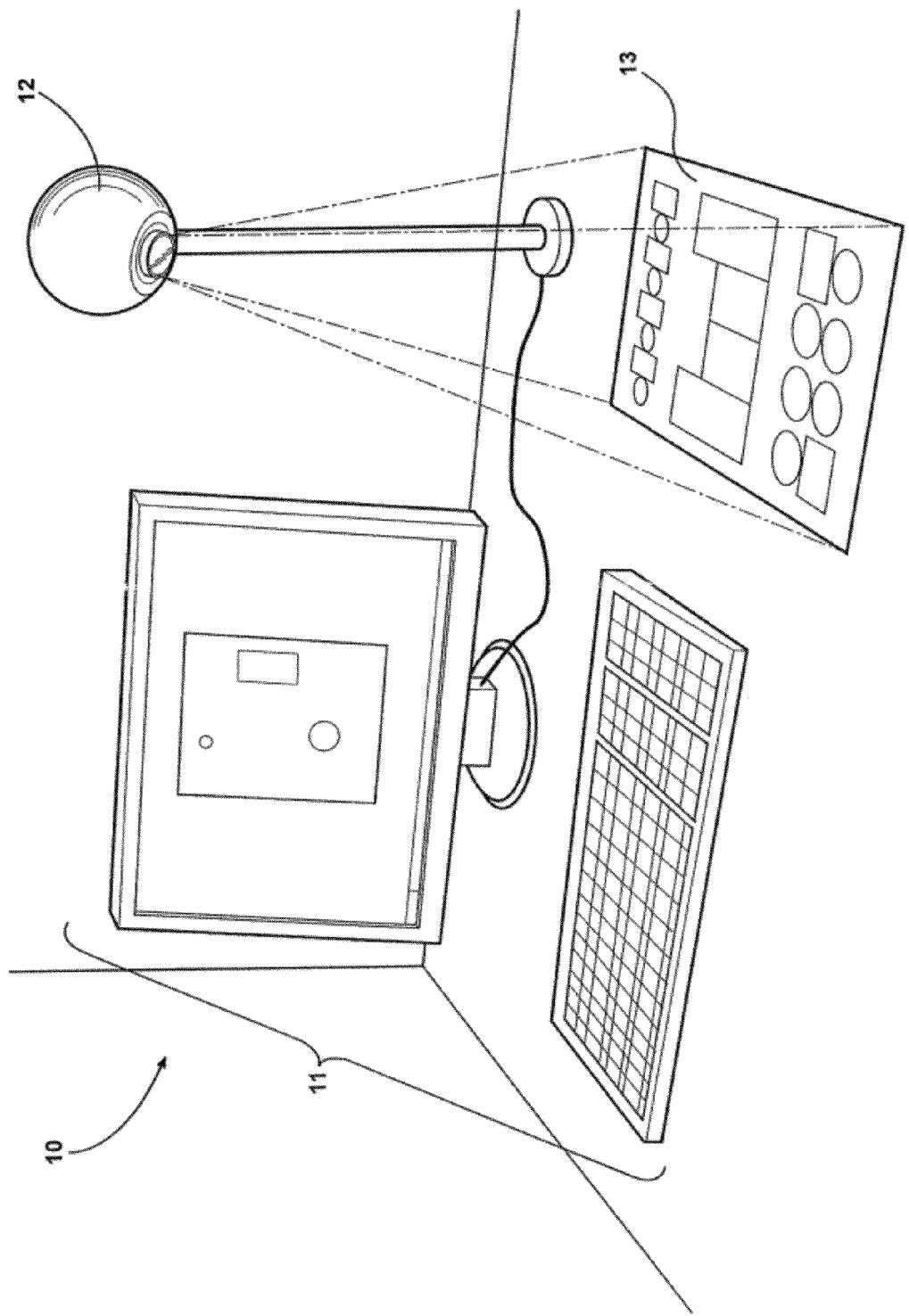
FIG. 1 illustrates a computer vision system which performs color identification.

FIG. 1 illustrates one aspect of a computer vision system 10 that performs color identification. The computer vision system 10 may include a computer system 11, a color camera 12, such as a webcam, and a field of view 13.

The computer system 11 may include one or more processors, a memory medium, monitor, and input devices, such as a keyboard and mouse and any other components necessary for a computer system. The computer system 11 also includes one or more software programs operable to perform color identification function. The software programs may be stored in a memory medium, such as a DRAM, SRAM, EDO RAM, etc., or a magnetic medium such as a hard drive, DVD, CD, or floppy disk. The computer system 11 is broadly defined to encompass any device, having a processor which executes instructions from a memory medium, such as a personal computer, workstation, mainframe computer, network appliance, internet appliance, personal digital assistant (PDA), cell phone, ipod, etc.

The color camera 12 can be an inexpensive webcam. The color camera 12 may comprise an image sensor such as a "Charged Coupled Device" (CCD) or "Complementary Metal Oxide Semiconductor" (CMOS). The color camera 12 may be connected to the computer system 11 USB port either through a wire or wirelessly. The cameras and the computer do not have to be collocated; they might even be 2000 miles apart. The color camera 12 may be attached to a flexible stand or clipped on a monitor to point at a particular field of view 13. The output of the color camera 12 is usually the values in 256 discrete levels of each of three color-components, red, green and blue (R, G, B), for each pixel of a target image in the field of view 13. The pixel-by-pixel color information of the target image is fed to the computer system 11 for each frame and this information is repeated on a continuous basis depending on the refresh rate of the color camera 12. The way the color information is processed by the software program of the computer system 11 is explained in details below.

The color identifying method can identify six (three factorial) colors; red, green, blue, yellow, cyan, or magenta with the use of three-component color camera 12 as well as black and white for a total of eight colors. With the advance of the four-component color cameras, 24 (four factorial) colors or a total of 26 colors including black and white can be identified. The present method identifies the colors of interest on a target image accurately under varying light and image conditions.

As a first step, the method receives the output information of the camera expressed in (R, G, B) values of color components of each pixel. The largest color component is then identified and all three color-components (R, G, B) are divided by this value. It is important to note that the largest color component may be different from pixel to pixel and is not an overall or fixed maximum. In this way, the present method creates a new color space called "Ratio Space". The components of the ratio space (r, g, b) are such that the largest component is always 1.0 and the other two components may be 0 or 1.0 or a value between 0 and 1.0.

From this point on, the method processes the color information from each pixel in ratio space values (r, g, b). Next, the ratio space values (r, g, b) are put to a "Threshold Test". If the values pass the threshold test then the information is identified as a "rich" shade of the color of interest. The present method departs from the prior art in that the prior art tries to identify every shade of a color on the target image by matching that color to an elaborate library of reference color images or templates. The improved method effectively and accurately identify "rich" shades of a color of a target image from the "pale" shades of a color under varying light and image conditions. Once the relevant pixels are identified as "rich" shades, the adjacent pixels are clumped together to form blobs and these blobs are then filtered by geometric characteristics such as shape, size, location, orientation, etc.

The method then keeps track of the information of a target image from one frame to the next. Any changes in the target image from one frame to the next or succession of frames can be used as an interaction between the user and computer. This interaction can be in the form of performing certain tasks or initiating applications or feedback, thus making the camera a convenient interface for the user. Thus, the first step in tracking is filtering out of the clutter of the target image all but a specific rich color. Next, this simple image is filtered to find blobs of this color with specific shape and size. This step is repeated for other specific rich colors. And finally, a target or set of targets of that are geometrically related to each other can simply be identified and used to trigger a computer action.

The threshold test is carried out in a "Distance" equation defined below. The distance equation converts color information from each pixel, in ratio space values (r, g, b), to "achromatic" color information (black, gray, or white) between 0 and 255 or more preferably to "binary" information black or white (0 or 255). The method creates a "Filter" by combining the threshold test into the distance equation and accomplishes to reduce the color information of a target image into a binary output, black or white. Black represents the color information that passed the threshold test as a "rich" shade of a color of interest or "target" and white represents the color information that failed the threshold test as a "fade" shade of a color or "unidentified" color. Thus, with a three-component color camera, the method can separate a target image into 6 regions of distinct colors.

The distance equation employs a "Scale Parameter" (S). The scale parameter is usually a very large number and set to a "negative" value for the primary component(s) of the color of interest so that it operates in the opposite direction to the "Threshold Value" (T). The distance equation also employs a function called POS (q) and POS (q)=0 if q$\leq$0 else POS (q)=q. The distance equation is defined as follows in terms of ratio space color component values (r, g, b):

$$\text{Dist}=\text{POS}(Sr^*(r-Tr))+\text{POS}(Sg^*(g-Tg))+\text{POS}(Sb^*(b-Tb))$$

Exemplary threshold values and scale parameters for 6 colors of interest are as follows:

RED: Tr = 1.0, Tg = 0.8, Tb = 0.8 Sr = −1000, Sg = 1000, Sb = 1000
GREEN: Tr = 0.8, Tg = 1.0, Tb = 0.8 Sr = 1000,

-continued

```
Sg = −1000, Sb = 1000
BLUE: Tr = 0.8, Tg = 0.8, Tb = 1.0 Sr = 1000,
  Sg = 1000, Sb = −1000
YELLOW: Tr = 0.95, Tg = 0.95 Tb = 0.8 Sr = −1000,
  Sg = −1000, Sb = 1000
MAGENTA: Tr = 0.95, Tg = 0.8, Tb = 0.95 Sr = −1000,
  Sg = 1000, Sb = −1000
CYAN: Tr = 0.8, Tg = 0.95, Tb = 0.95 Sr = 1000,
  Sg = −1000, Sb = −1000
```

The method can also determine the achromatic colors such as black and white when all three color components in ratio space (r, g, b) are 1.0 or nearly 1.0, if so by looking at the original (R, G, B) values being (large) above a white threshold or (small) below a black threshold.

For a given pixel of color information, if the output of the distance equation is 0 then that color passes the threshold test, if the output of the distance equation is anything but 0 then that color fails the threshold test.

The following example demonstrates how distance equation filters the color information from the camera output to binary color information:

Example 1

Consider Two Pixels with the Following Components

Pixel 1: (R, G, B)=210, 50, 40 and Pixel 2: (R, G, B)=210, 190, 80

In ratio space values: Pixel 1: (r, g, b)=1.0, 0.238, 0.190 and Pixel 2: (r, g, b)=1.0, 0.904, 0.381 then the distance equation for the Pixel1 and Pixel2 become:

$$\text{Dist 1} = \text{POS}(-1000*(1.0-1.0)) + \text{POS}(1000*(0.238-0.8)) + \text{POS}(1000*(0.190-0.8)) = 0+0+0=0$$

$$\text{Dist 2} = \text{POS}(-1000*(1.0-1.0)) + \text{POS}(1000*(0.904-0.8)) + \text{POS}(1000*(0.381-0.8)) = 0+10.4+0=10.4$$

The result of distance equation is "0" i.e. the Pixel 1 passes the threshold test and is identified as a rich shade of red and the output of the filter is set to black. On the other hand, Pixel 2 does not pass the threshold test and is categorized as a fade or pale shade or unidentified color, therefore, the output of the filter is set to white (i.e. 255).

There are several ways for defining a filter and setting threshold values. For example, a pixel representing a green color might register the following values in the ratio space: (r, g, b)=0.45, 1.0, 0.55. A filter can be constructed such that anything with $Tr \geq (1.45/2)$ or $Tg \geq 1.0$ or $Tb \geq (1.55/2)$ is rejected by the filter. This threshold is called the "half-distance-value" to the primary color component (1.0).

The method can be enhanced to handle cameras that are not calibrated correctly for the ambient lighting. This requires a preprocessing phase that consists of the following steps: First, identifying the component bias of each color component (R,G,B). This can be done by red, green, blue targets or a set of known black blobs and identify the lowest component values of each of these colors. Subtract each of these three values from their corresponding component in each pixel of the entire image. Second, multiply each R,G,B value of every pixel in the image by a single scale factor so that the entire image brightness is enhanced to compensate for the brightness that was subtracted. For the ratio signature space this step is unnecessary since the ratio cancels out any factor that is common in both the numerator and the denominator.

To provide successful commercial applications in color identification, the method should be very robust in every lighting condition. A field of view might be under direct sunlight or in a shadowy room or under incandescent lights during evening, etc. The strength of the method in identifying color particularly in challenging lighting environments comes from the "Ratio Space". The ratio space has an impact on finding targets and colored objects in a typical environment for commercial and consumer applications. The following example illustrates this point:

Example 2

The camera output might register (R, G, B)=0.6, 0.8, 92.8 and (r, g, b)=0.006, 0.008, 1.0 for a blue spot over a sunny part of the field of view or (R, G, B)=3.2, 14.3, 63.5 and (r, g, b)=0.05, 0.225, 1.0 over a shadowy region of the field of view. The camera output for a red spot might register (R, G, B)=99.6, 0.4, 0.4 and (r, g, b)=1.0, 0.004, 0.004 over a sunny part of the field of view or (R, G, B)=64.7, 17.8, 4.6 and (r, g, b)=1.0, 0.275, 0.07 over a shadowy region of the field of view. While the original (R, G, B) values might fluctuate significantly from sunny regions to shadowy spots of the field of view, the ratio space values make it easy to identify the color of interest.

Another advantage of the present method in identifying color is the ability to optimize the "camera parameters" for varying lighting conditions. Camera parameters such as: gain, brightness, contrast, saturation, sharpness, white balance, backlight compensation, etc. can be optimized for a given field of view and the accompanying lightning conditions. The method accomplishes this optimization by going through a calibration process for a known field of view as a preprocessing step. Once the camera parameters are optimized for a given field of view, the method is ready to launch.

The field of view 13 for the present method can be anything that the camera 12 is pointing at. The camera 12 can be pointing at a desktop such as in FIG. 1, and in this case, the field of view 13 can be a plain sheet of paper, a book, an object, etc. The camera 12 can be pointing at a person or people in front of the computer, or a scene with items or objects in it. The field of view 13 can be a screen or whiteboard that the camera 12 is pointing at. Further, the target image that is processed by this method can be the entire field of view or part of the field of view such as an "area of interest". For example, not every item or object in the field of view might be changing from one frame to the next. In this case, the target image might focus on the section of the field of view that might be an area of interest.

It should be by now obvious to one skilled in the art that the present method can be used in a variety of consumer and commercial applications. One aspect of creating consumer friendly applications using the method is the ability to identify color effectively under varying lighting conditions in the field of view of a camera. The monitoring and tracking changes in the field of view of a camera lead to potential uses not only in traditional machine vision applications but also open up consumer applications with the use of inexpensive webcams.

Figure 2:
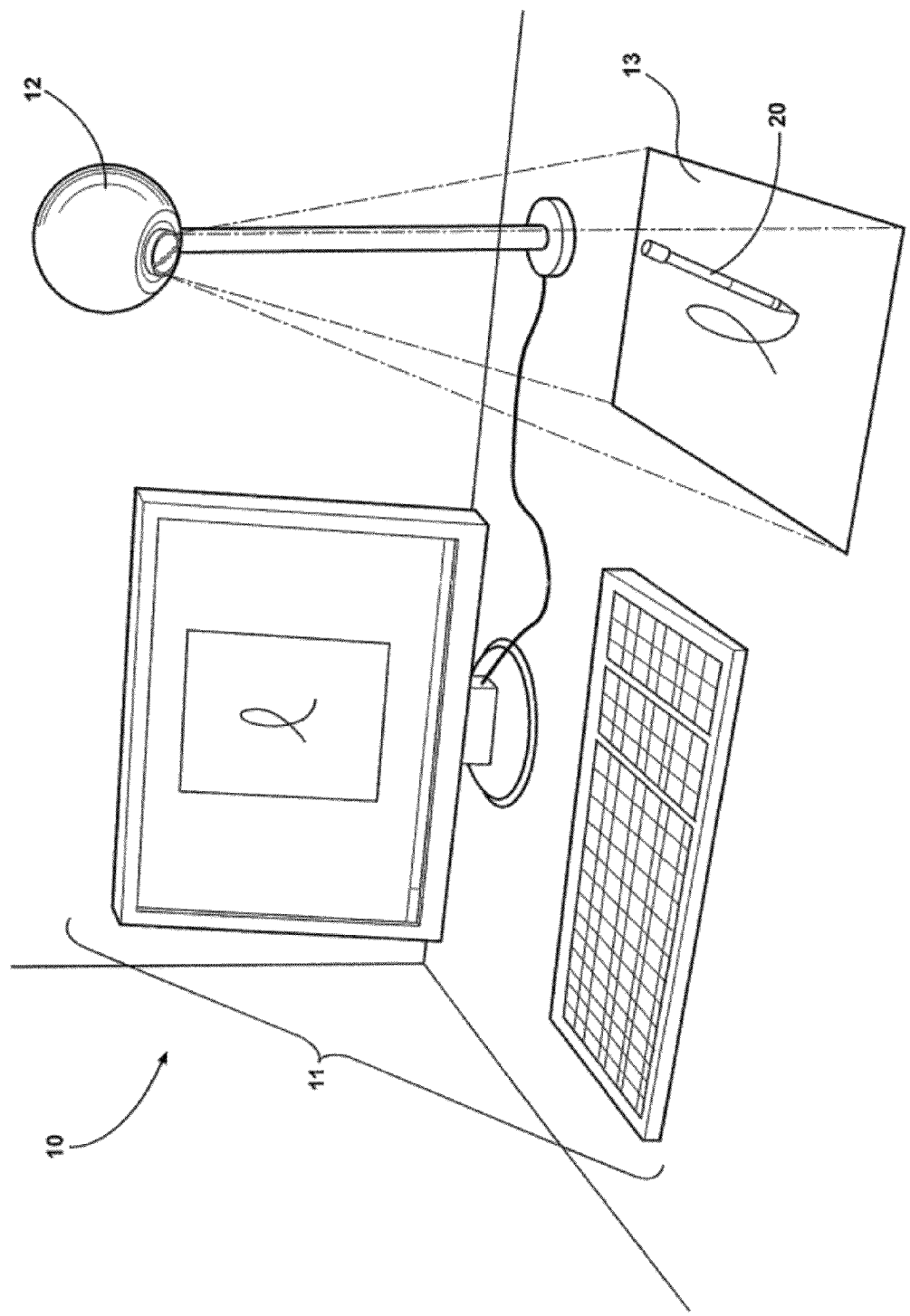
FIG. 2 illustrates a computer vision system that performs color tracking.

FIG. 2 illustrates a computer vision system that performs color tracking according to one aspect of the present method. An application of the present method is given in FIG. 2 as an example for tracking an object 20, such as a pen, in the field of view by identifying relative locations of colored sections of this object. Tracking of simple objects such as a pen or finger in a field of view can be used as an alternate input device for computer aided design and drawing CAD) applications.

Another aspect of the present method is based on locating a set of points that transition from a patch of one type of Rich Color to an adjacent patch of a different type. Whenever possible these points are strung together to form a chain which is referred to as a Rich Color Transition Curve. This method can be used to detect and locate targets in an image, to distinguish one target from another, to define target properties, or filter data. The image is typically, but not always, in the field of view of a camera or cameras. The target properties can be compared to a database and then used as an interface to a computer for machine and computer applications.

This aspect also relates to a triggering mechanism or mechanisms by identifying Rich Color Transition Curves, combinations of Rich Color Transition Curves and Rich Color boundaries along with their colors, orientations, positions, and motion (both speed and acceleration) combined with a computer or machine interface which allows the invention to be used for consumer or industrial applications

DEFINITIONS

Color component—the color components $C_n$ where $1<=n<=N$ that make up an image. In the most common case $N=3$ and $C_1$=Red, $C_2$=Green, and $C_3$=Blue.

Ratio Color component—the Ratio Color components $c_n$ for a pixel where $1<=n<=N$ are obtained from the input colors $C_n$ as defined by $c_n=C_n/C_H$ where $C_H$ is the largest component of this pixel.

Type or ID—most of the terms defined in this section have an associated identifying number or ID.

Rich Color—A color made up of 1 or more color components that are much larger than the remaining color components as typically defined by the Rich Color Filter equation for a filter type "m" color distance equation. For a pixel located I, j the color distance equation is defined as follows in terms of ratio space color component values ($c_1, c_2, \ldots c_N$):
$A_m = POS(B_{1,m}*(f(c_1)-T_{1,m}))+POS(B_{2,m}*(f(c_2)-T_{2,m}))+ POS(B_{N,m}*(f(c_N)-T_{N,m}))$ Where, for color component n and color filter type m, $T_{n,m}$ is a color threshold, $B_{n,m}$ is the Bias, and the function POS (A) such that POS (A)=0 if A is less than or equal to 0, ELSE POS (A)=A. The function $f(c_n)$ can simply be any function that emphasizes Rich Color for example $f(c_n)=[E_1*c_n]+E_2$ or it might be $f(c_n)=[E_1*c_n*c_n]+[E_2*c_n]+E_3$ for input parameters $E_1, E_2, E_3$. Typical Rich Color Filter Parameters ($T_{1,m}, T_{2,m}, T_{3,m}, B_{1,m}, B_{2,m}, B_{3,m}$) for RGB images are as follows:

Filter type m=1, RED: (1.0, 0.8, 0.8, −1000, 1000, 1000)
Filter type m=2, GREEN: (0.8, 1.0, 0.8, 1000, −1000, 1000)
Filter type m=3, BLUE: (0.8, 0.8, 1.0, 1000, 1000, −1000)
Filter type m=4, YELLOW: (1.0, 1.0, 0.8, −1000, −1000, 1000)
Filter type m=5, MAGENTA: (1.0, 0.8, 1.0, −1000, 1000, −1000)
Filter type m=6, CYAN: (0.8, 1.0, 1.0, 1000, −1000, −1000)

Enhanced Ratio Color types—The total number of color categories, M, that include both Rich Colors, N factorial (N!), that can be developed from a Rich Color Filter plus Black, and White. Typically N=3 and M=8.

Target Color—a subset of L Rich Colors and possibly Black and/or White that are used to find a target or object in an image such that L<=M.

Rich Color Boundary—The perimeter of a Rich Color patch that separates it from non-Rich colored areas.

Transition Curve—The curve or chain of points or polyline that represents the separation of two Rich Color patches and include Color Pairing data. For simplicity even a single point is referred to as a curve or chain of length one.

Color Pairing—The property of a Transition Curve which identifies a left side color and a right side color as a curve is oriented facing the end point.

Search-line—A row or column or angled line of pixels across the image. A complete set of consecutive search-lines defines the complete image.

Region of Interest (ROI)—rectangular subsection of the image to be studied

Transition Point—The location on a search-line that best defines the transition from a patch of one Rich Color type to a nearby patch of a different Rich Color type.

Figure 3:
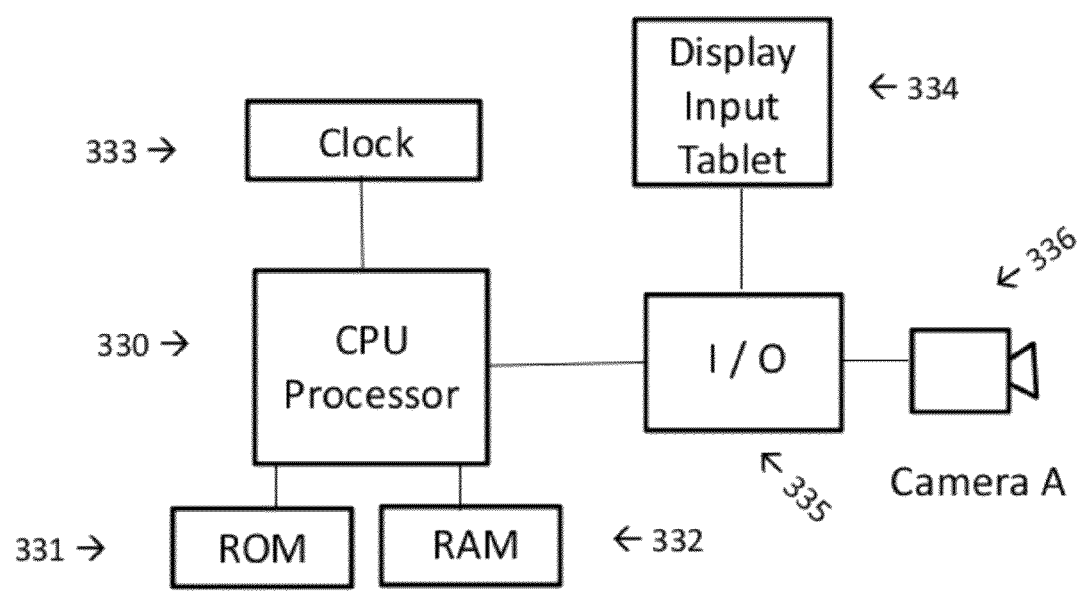
FIG. 3 illustrates the components of a typical computer system used to implement the software version of this method.

A block diagram shown in FIG. 3 for a typical computing system, which may include the computer system 11 shown in FIGS. 1 and 2, includes a central processing unit (CPU) or a processor 330. Input/output (IO) circuitry 332 is coupled to the processor 330 and provides an interface to and from the processor 330 from inputs and outputs, such as a display/input tablet 334, or a camera 336. Internally, the processor 330 is coupled to a clock 333 and memory 331, such as ROM memory and/or RAM memory.

The method is embodied in software code on a computer medium which may be portable or a computer medium attachable to the processor 330 for execution by the processor 330 or stored in one or both of the memories 331. The memories 331 maybe external from the processor 330 integral with the processor 330, etc.

The display/input table 334 may be a separate display and a separate tablet or input device, such as a keyboard, mouse, etc.

The display/input tablet 334, whether embodied in a single integrated unit or in separate units, will have appropriate audio output and possibly a microphone input.

It should also be noted that the camera 336 maybe integrated as part of the display/input tablet 334 or as a separate element as shown in FIG. 3. Further, all of the computing device circuitry, such as a processor 330, memory 331, input/output circuitry 332 maybe incorporated internally as part of the camera 336.

Figure 4:
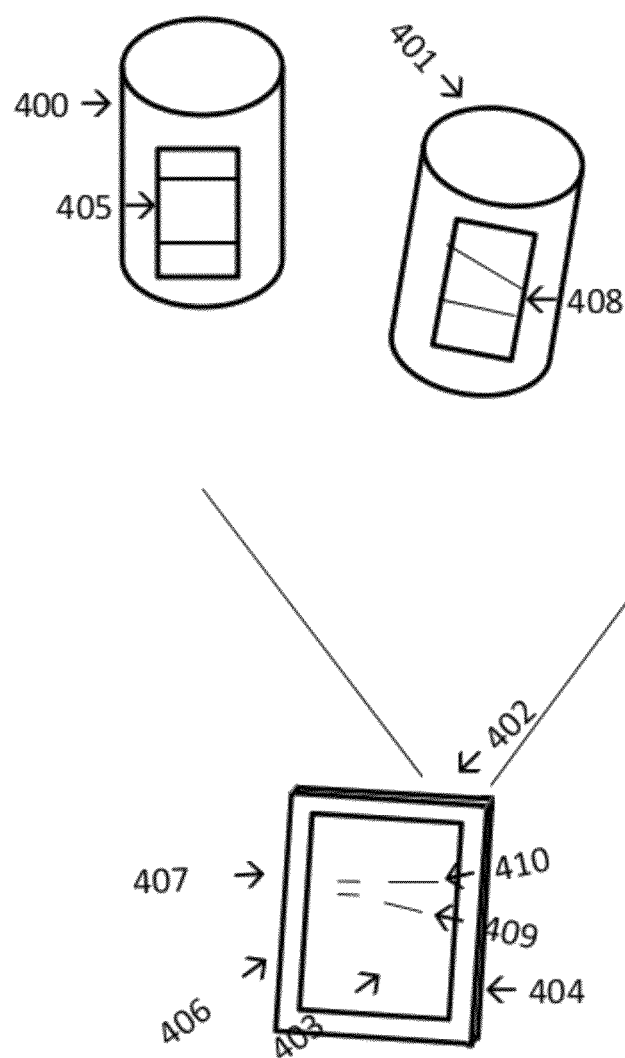
FIGS. 4 and 5 are pictorial representations of Rich Color Transition Curve tracking according to using a Tablet computer or Smart Phone.

FIG. 4 illustrates how Rich Color Transition Curve tracking can be used to develop a Beverage Can Game using a standard tablet computer or smart phone 104. The game, for example, increases or decreases the volume of audio channels for voice, drums, guitar, etc. by tying relative positions and orientations of cans held by different players. Then the tempo or other characteristics can be tied to the absolute positions of the cans. The can 3D positions and orientations (roll, pitch, yaw) are determined by tracking the length, orientation, and other geometric and motion properties from frame to frame of the camera using the methods described in this application. FIG. 4 shows two cans 400, 401 each with a unique target 405,408 that is viewed by a camera 402 that is in a device with a computer (in this case a Tablet computer 404 with display 403). The target Rich Color patches are separated by Transition Curves.

Figure 5:
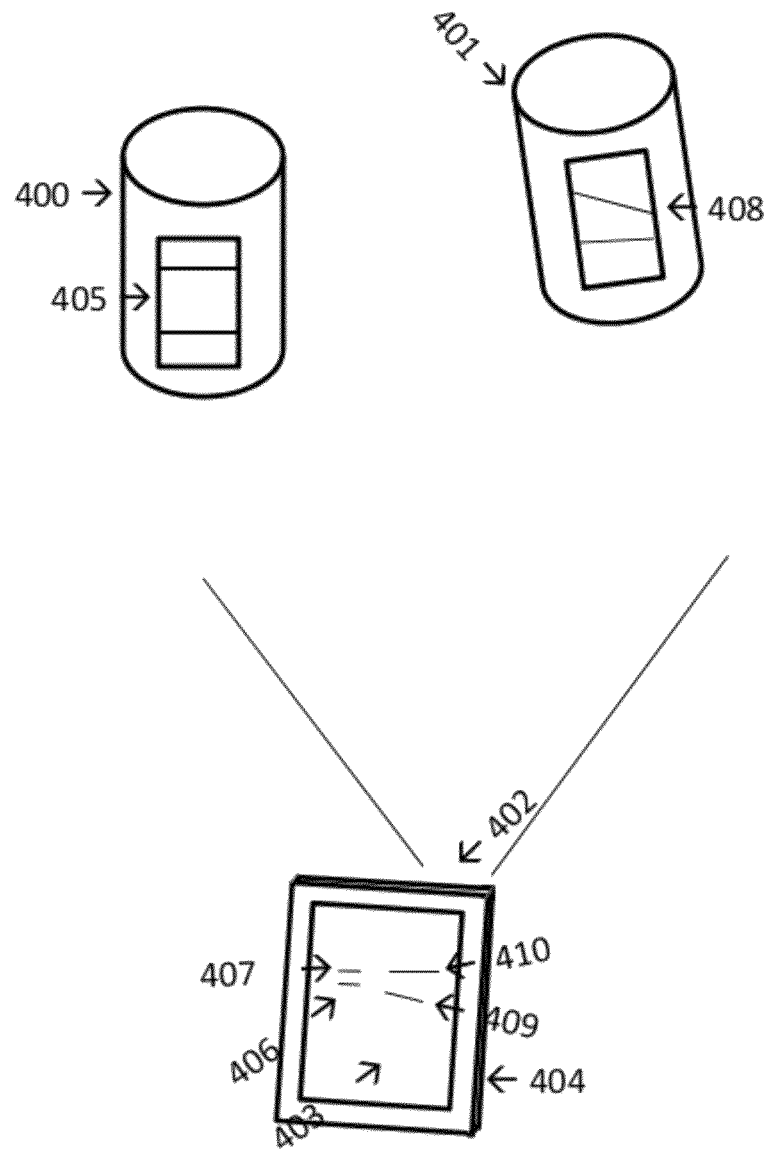

FIG. 5 show the same set of objects one frame later where the cans 400, 402 have moved. The change in overall size of a target in the image can be used to determine the target's distance from the camera. Pitch and yaw can be determined by determining a preferential shrinkage of the target along a polar angle from the center of a target.

Figure 6:
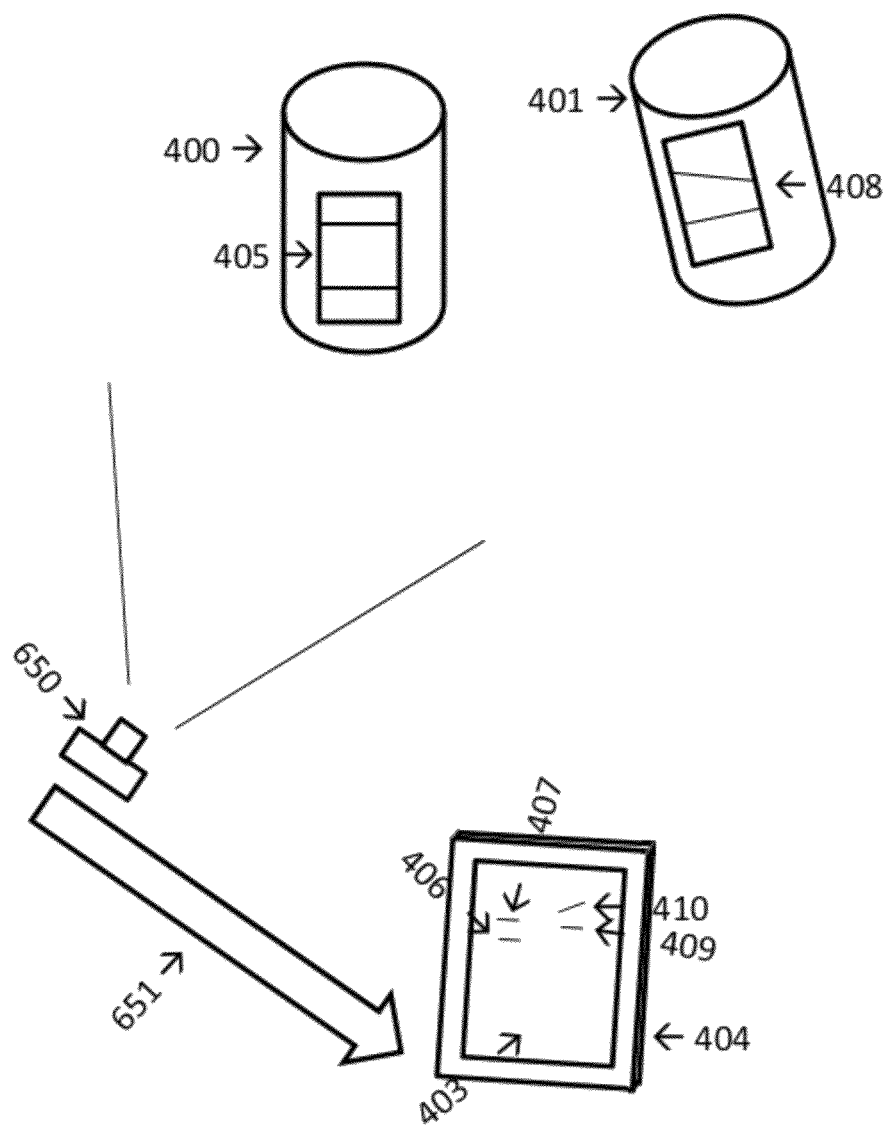
FIG. 6 is a pictorial representation showing the use of cameras implementing the Rich Color Transition Curve method in vision applications.

FIG. 6 illustrates how a camera 650 that has the Rich Color Transition Curve Method built in can be used in vision applications. Wireless communication 651 only has to ship a small set of Transition Curve data for each frame. The central processor or computer 604 can use the transition curves as target signatures and, when targets of interest are detected, a full analysis of the target location and orientation can be conducted.

Figure 7:
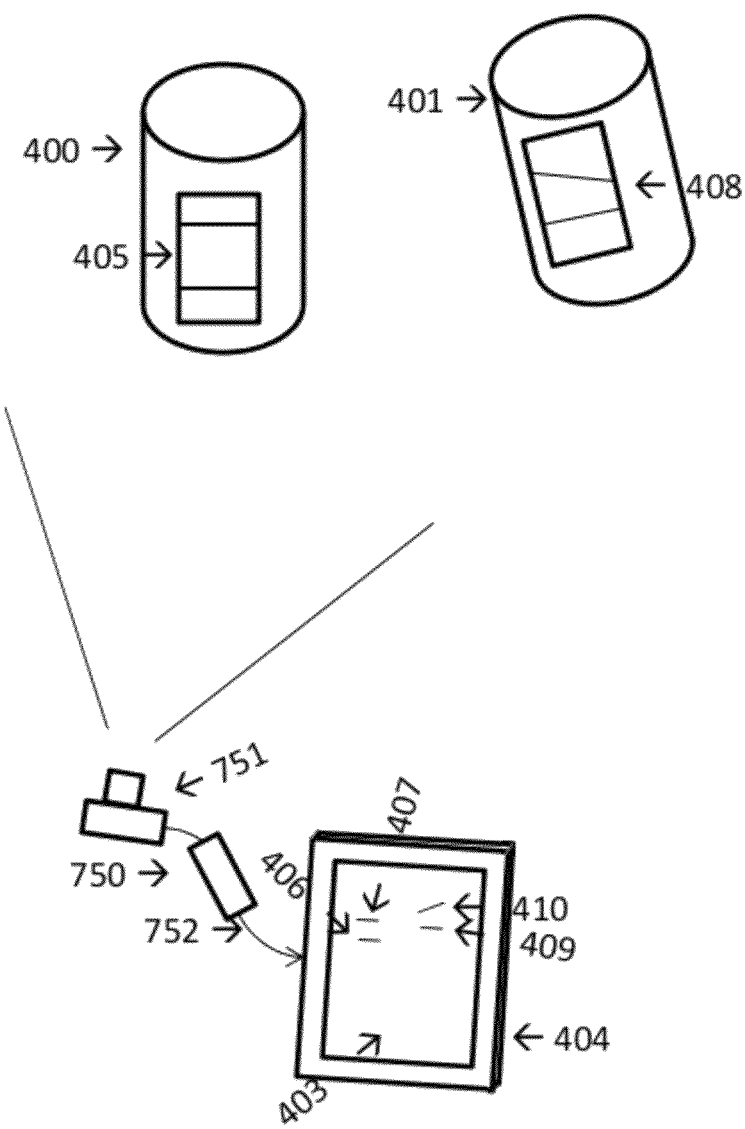
FIG. 7 is a pictorial representation showing how a module containing circuitry utilizing the Rich Color Transition Curve method can be used to upgrade standard video cameras.
Figure 8:
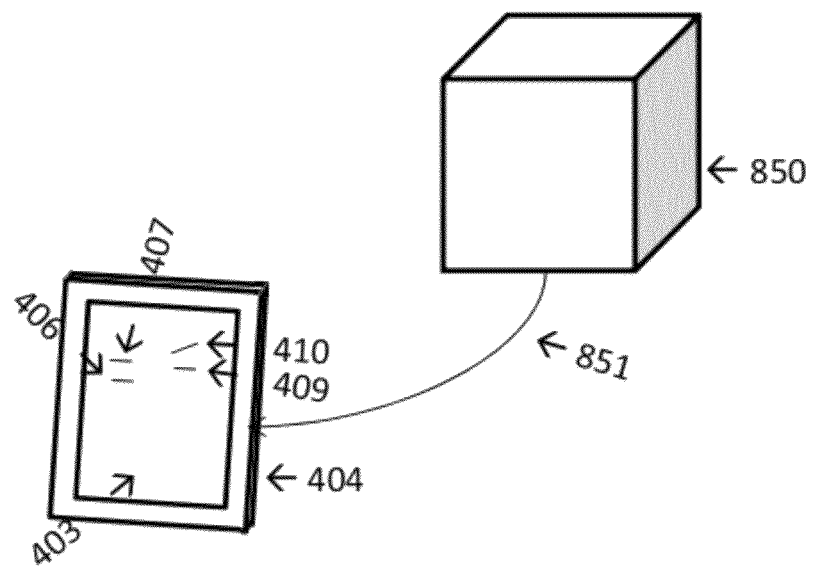
FIG. 8 is a pictorial representation showing image data coming from a data storage device to be analyzed by the Rich Color Transition Curve tracking.

FIG. 7 illustrates how a small module 750 housing simple circuitry embodying the Rich Color Transition Curve Method can be used to upgrade a standard video camera 751. The module 752 is wirelessly or hardwired 752 to the computer 404. FIG. 8 illustrates how the Rich Color Transition Curve Method can be used on an image previously stored in a storage device 850 coupled by the cables 851.

One version of the beverage can game uses the cans to control the sound tracks that make up a song. For instance, the distance of the left beer can from the camera could control the drum volume while that of the right can could control the guitar volume. The variation in time of the left angle could control the tempo and the right angle could control the cow bell volume. The relative distance between the two cans could control a singer's volume. The smartphone (or other camera/computer device) can be manipulated by another player to modify the geometric properties of the targets as tracked by the Rich Color Transition Curves. Furthermore, the targets can be kept stationary, and the camera moved. The path and geometric properties, as well as the speed and acceleration of the Transition Curves in the sequence of video frames can be used to define a predefined macro or computer program or identify a specific database item to be used for with the macro or computer program.

In order to both reduce repetitive language in this description and clearly described the method, consistent numbering is used in FIGS. 9-19 such that the last two digits refer to items in the set of drawings is identified below and the other digits are the Figure numbers:

- 00—Object s colored in pale colors
- 01—Reddish colored human face
- 02—Object colored Rich Red
- 03—Object colored Rich Green
- 04—Object colored Rich Blue
- 05—Rich blue colored sweater
- 06—Object colored Rich Magenta
- 10—Target with Rich Red, then Blue, and then Green (also used in FIGS. 19, 20)
- 11—The Rich Red patch of Target 10
- 12—The Rich Green patch of Target 10
- 13—The Rich Blue patch of Target 10
- 16—Transition Curve between the Rich Blue and then Rich Green patches of Target 10
- 17—Transition Curve between the Rich Red and then Rich Blue patches of Target
- 20—Target with Rich Red then Green and then Blue
- 21—The Rich Red patch of Target 20
- 22—The Rich Green patch of Target 20
- 23—The Rich Blue patch of Target 20
- 25—Transition Curve between the Rich Red and then Rich Green patches of Target 20
- 26—Rich Color Transition Curve between the Rich Green and then Rich Blue patches of Target 20
- 30—Target with Rich Red at angle then Green and then Blue
- 31—The Rich Red patch of Target 30
- 32—The Rich Green patch of Target 30
- 33—The Rich Blue patch of Target 30
- 35—Transition Curve between the Rich Red and then Rich Green patches of Target 30
- 36—Transition Curve between the Rich Green and then Rich Blue patches of Target 30
- 40—Target with Rich Red then Blue
- 41—The Rich Red patch of Target 40
- 43—The Rich Blue patch of Target 40
- 47—Transition Curve between the Rich Red and The Rich Blue patches of Target
- 57—Transition Curve between the Rich Red head 01 and the Rich Blue sweater
- 91—Noise
- 95—Target 20 center
- 96—Target 10 center
- 99—Non-Rich background.

Figure 9:
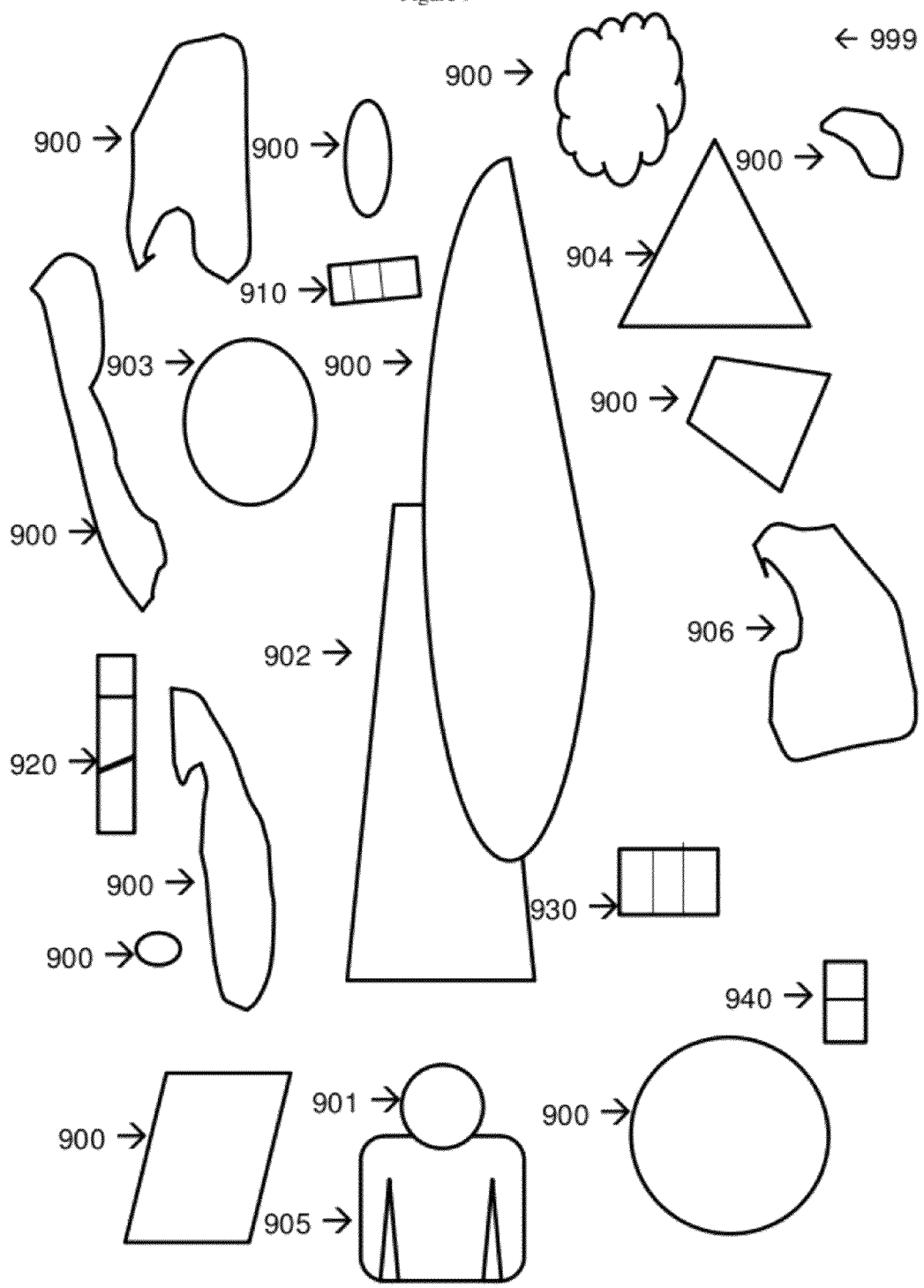

FIGS. 10, 11, 12 and 13 show what would typically remain after respectively applying Rich Color Filters for Red, Green, Blue and Magenta to the original image shown in FIG. 9 assuming good cameras, lighting, and thresholds. If the bias for each color filter was set to a very high value, a binary image would result from each filter step. Invariably filtering in the real world introduces noise artifacts 1091 as seen in FIGS. 10-14.

Figure 14:
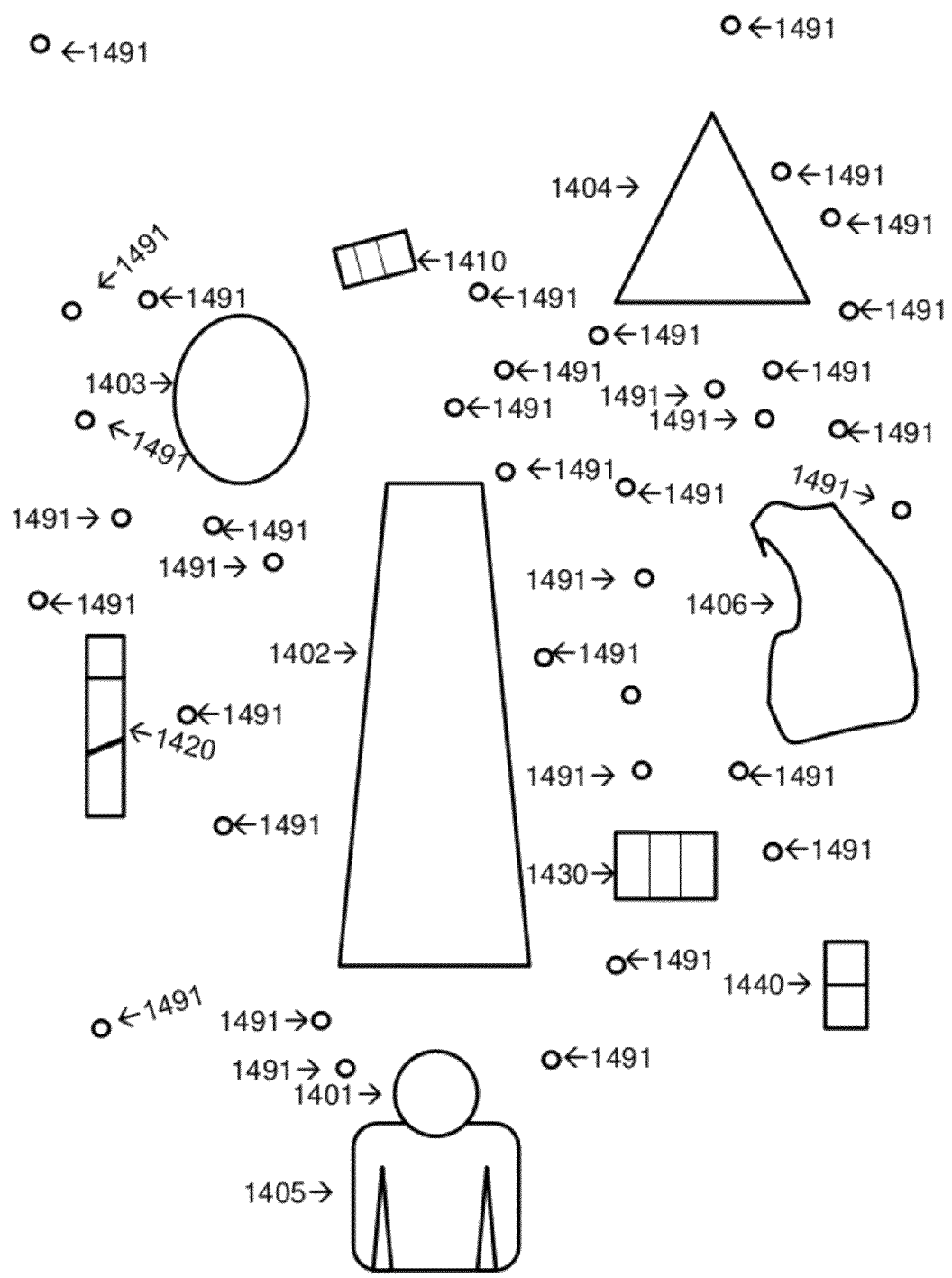

FIG. 14 shows a composite monochrome image that is created from images shown in 10, 11, and 12 such that Red pixels have a value of 1, Green 2, and Blue 3 (since the Rich Green and Rich Blue Binary Filtered images were multiplied by 2 and 3 respectively before added to the Rich Red Binary Filtered images) while everything else has a value of 0.

Figure 10:
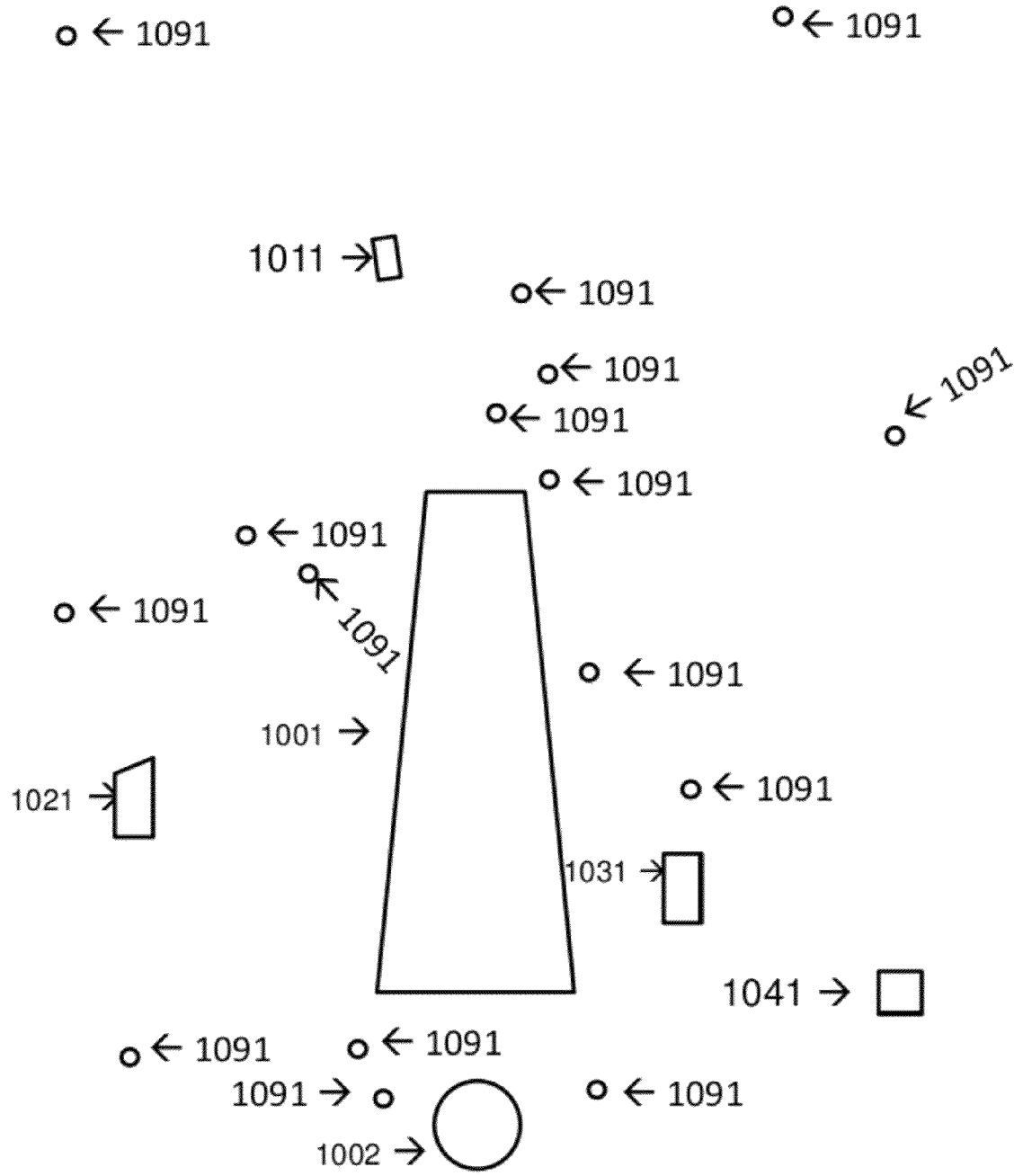
Figure 11:
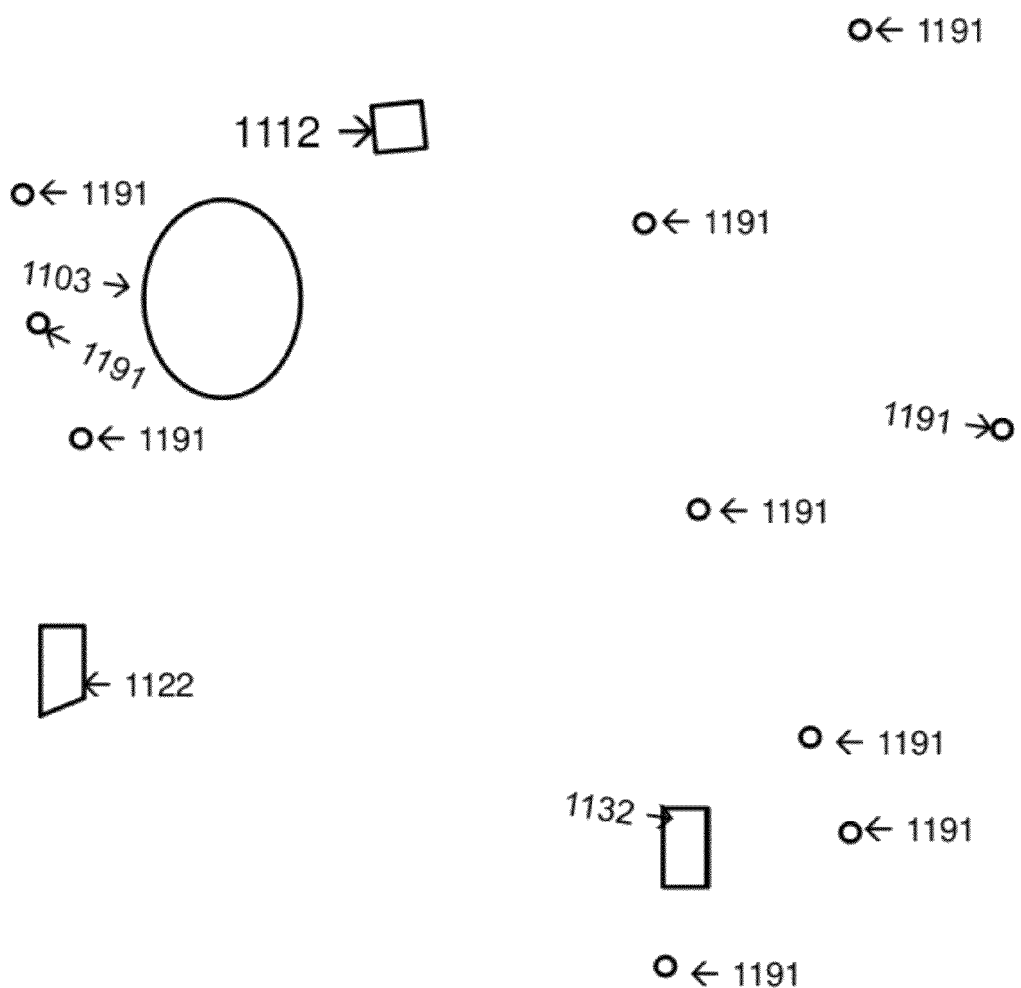
Figure 12:
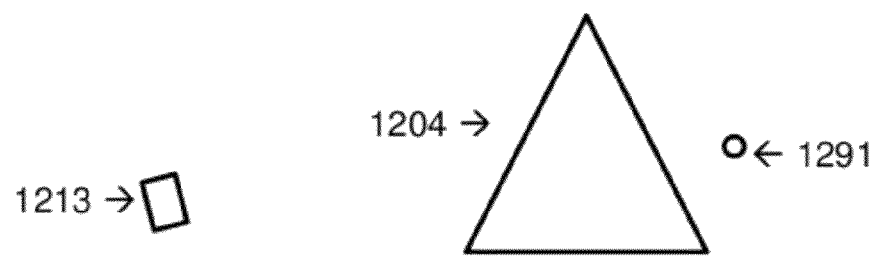
Figure 12:
Figure 12:
Figure 12:
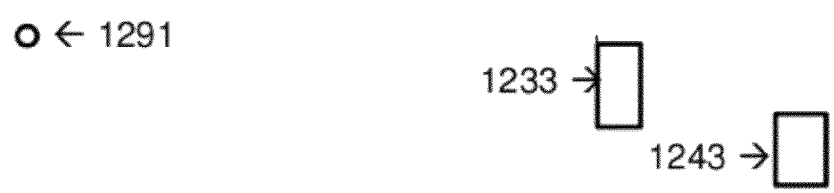
Figure 12:
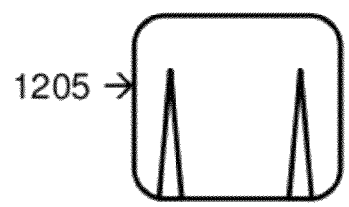
Figure 13:
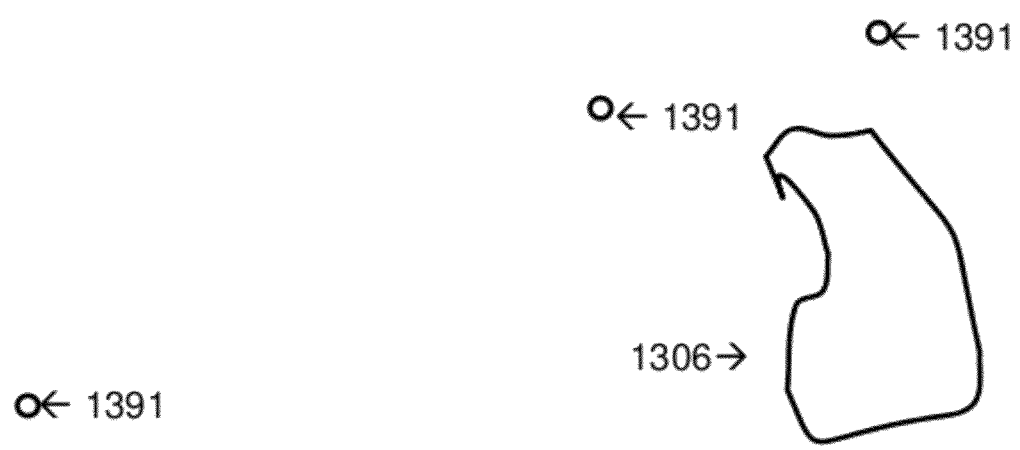
Figure 17:
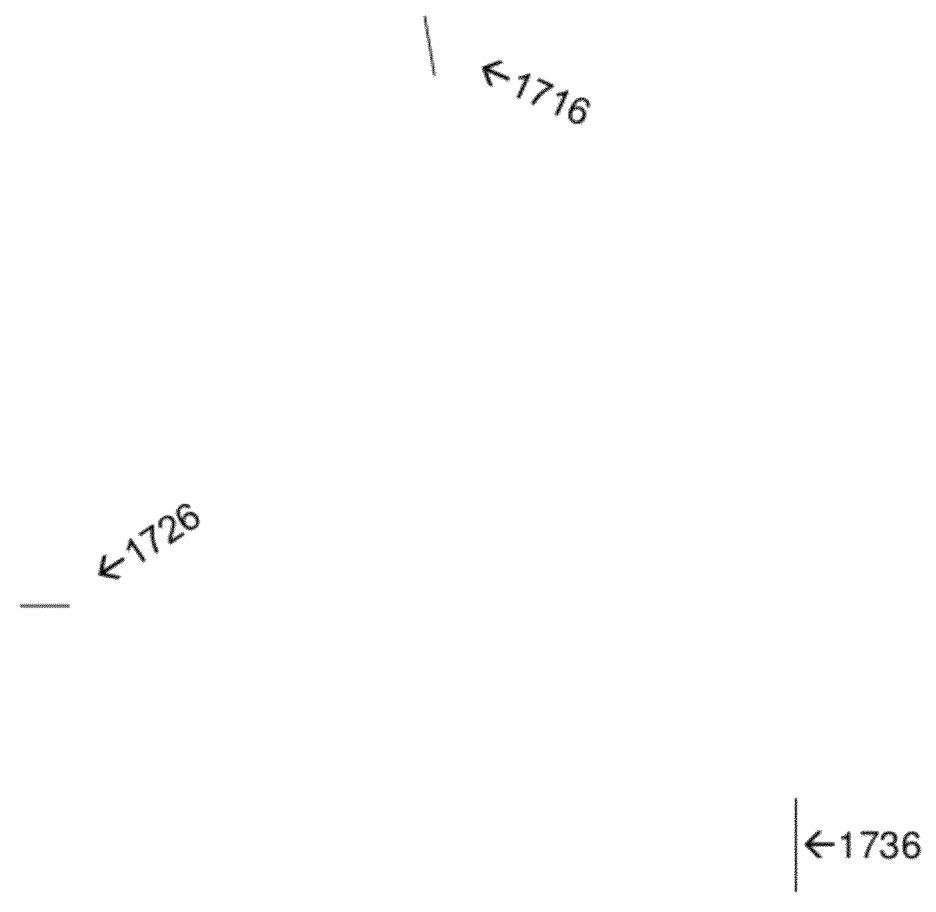

FIGS. 15, 16, and 17 show the results of passing the images from FIGS. 10, 11 and 12 through a Rich Color Transition Curve Finder for Red/Green Transition Curves, Red/Blue Transition Curves, and Green/Blue Transition Curves respectively. The Transition Curves that separate patches of Rich Color from each other are then identified first as points that are then strung together into Transition Curves. These curves have additional characteristics of a start and end as well as a left side color and a right side color which is referred to as "Color Pairing". Color Pairing is very useful in identifying which Transition Curves belong to which targets. The geometry and color characteristics of each line are then stored and compared to a target database. The relative size, distance apart, number of Transition Curves, shape, orientation, color pairings, orientation of the color pairing, and other characteristics are used to identify a specific set of targets from other data. This should be a simple task since the remaining Transition Curves should be few compared to the original challenge of 1M or more of unassociated pixel data.

Figure 18:
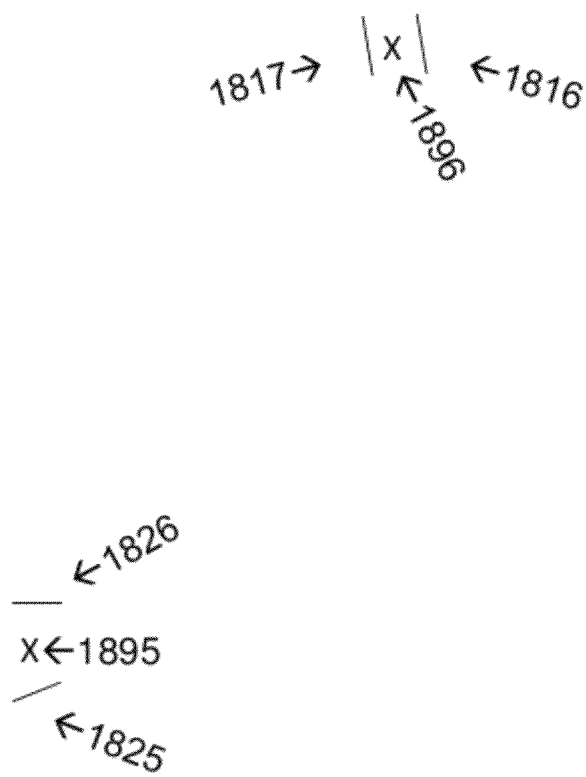

FIG. 18 shows four Transition Curves remaining after database identification leading to two targets. Two separate search techniques are presented in this one figure. The target on the lower left (original 920 in FIG. 9) was found using the database to find a target with Transition Curves 1825 and 1826 that have the correct color pairing and relative angle to each other. The geometric center of these two Transition Curves is designated as 1895. The method used to find the second target (original 910 in FIG. 9) is the inline method that is described below in FIG. 20-23. FIGS. 22 and 23 show how the first two points of each of the two Transition Curves (1816, 1817) that come from target 910 are found. This method is well suited for hardware implementation.

Figure 19:
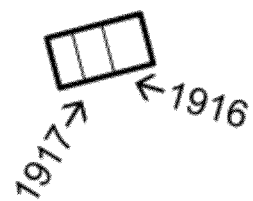
Figure 19:
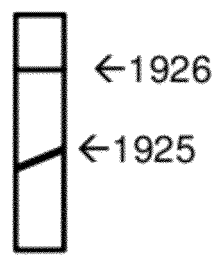

FIG. 19 shows that the target is identified additional information can be gathered from the database or searched for in a region around the target or from the inline method itself. The size, orientation, and location of this region can be calculated from the geometric information gathered from the Transition Curves together with database search parameters for the given target. If the database had physical information such as mass and moment, then forces and other physics can be computed from video images. Finally the target database can contain information on which hardware should be turned on or off or which software programs should be run and what parameters should be used to operate these programs.

By repeating the method with different threshold and camera parameters and then comparing the results with expected results of known targets for a fixed target and environment, it is possible to optimize the camera and threshold parameters.

Figure 20:
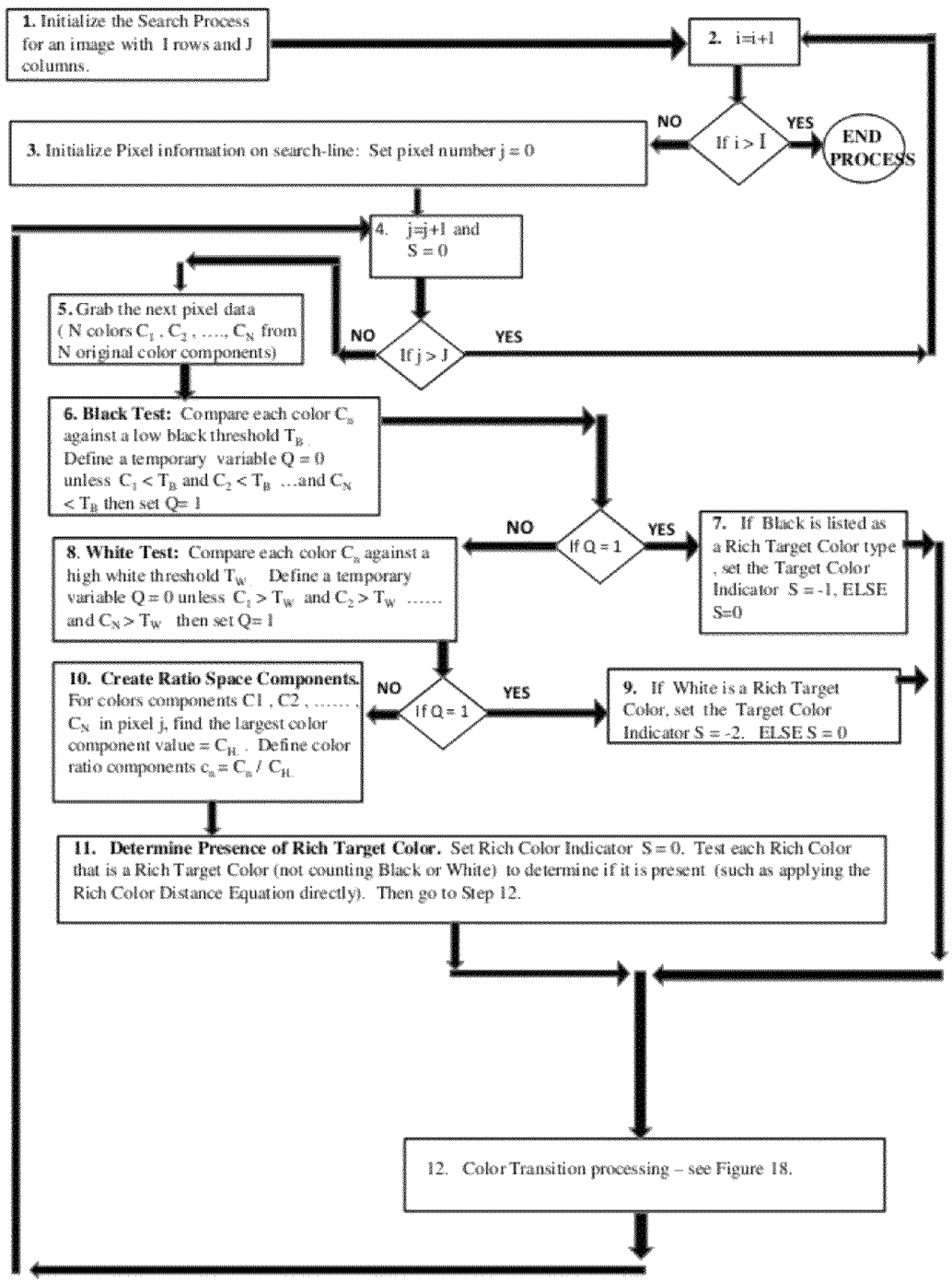
FIGS. 20 and 21 are flowcharts depicting the sequence of steps in the present method as performed one pixel at a time on a data string.
Figure 21:
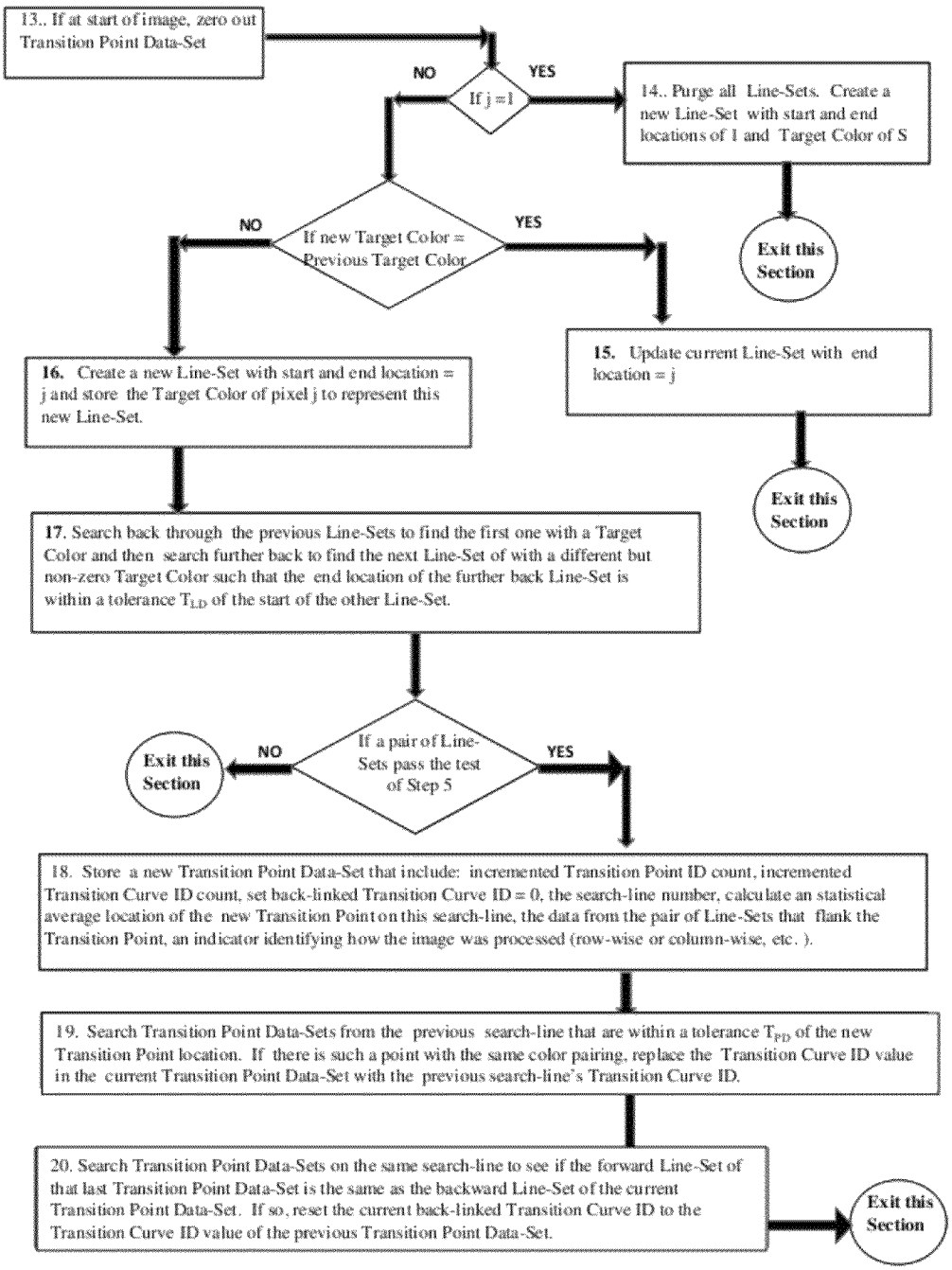

FIGS. 20 and 21 show a flowchart that illustrates how the method can be implemented on a stream of pixels making it ideal for hardware implementation. Step 1 initializes the Search Process for an image of I rows and J columns. Start with i=0 j=0 (where i is the search-line number), and initialize the variables defining the targets and color characteristics. Step 2 Increments the search-line count i=i+1. Then test to see if i is outside of the image; if so end the process. Step 3 initializes Pixel information on Search-line i. Set the pixel number j=0 and purge the memory of "Line-Sets". We define a Line-Set as a set of three items of data defining a linear patch of data that has a common Target Color: the Color Indicator, the start pixel location, and the end location positions for color patch. Step 4 increments the pixel count j=j+1 and sets the Rich Color Indicator S=0. Then it tests and If j>J (where J is the total number pixels in a search-line). If j is outside the image, return to Step 2. In Step 5 grab the image data for pixel j (N colors $c_1, c_2, \ldots, c_N$ from N color components). Then in Steps 6-9 test if all of the original components $C_n$ are below a Black Threshold, $T_B$, or above a White Threshold, $T_W$. If true, then the Target Color Indicator is set to S=−1 or S=−2 respectively and then proceed to Step 12. If false, then proceed to Step 10 where to find the largest incoming color component $C_H$ of the pixel j.

In Step 11 apply the Rich Color Filter to produce a flag setting representing the binary image value for the current pixel for each color component. A color made up of 1 or more color components that are much larger than the remaining color components as typically defined by the Rich Color Filter equation for a filter type "m" color distance equation. For a pixel located I, j the color distance equation is defined as follows in terms of ratio space color component values ($c_1, c_2, \ldots c_N$):

$$A_m = POS(B_{1,m}*(f(c_1)-T_{1,m})) + POS(B_{2,m}*(f(c_2)-T_{2,m})) \ldots + POS(B_{N,m}*(f(c_N)-T_{N,m}))$$

If $A_m=0$ and the filter color m is a Target Color, set a Target Color Indicator, S, to the Target Color values; otherwise set S to a value indicating that it is a non-Target Color. $T_{n,m}$, is the threshold for color component n and color filter type m, $f(c_m)$ is a function of $c_n$, and the Bias $B_{n,m}$, (or "scale parameter") for color component n and color filter type m. The function POS (A) such that POS (A)=0 if A is less than or equal to 0, ELSE POS (A)=A. The function $f(c_n)$ can simply be any function that emphasizes Rich Color for example $f(c_n)=[E_1*c_n,]+E_2$ or it might be $f(c_n)=[E_1*c_n*c_n]+[E_2*c_n]+E_3$ for input parameters $E_1, E_2, E_3$.

The Rich Color filter could be implemented in other ways. For example, each of the terms between the plus signs in the distance equation could be implemented with IF tests. Similarly, a Rich Color Look-Up Table could have been used to produce similar results. The basic idea is the same; search for the presence of Rich Colors in the Rich Color Ratio Space.

FIG. 21 shows a method where the Rich Color Indicator, S, can be used along with two types of Data-Sets (Line-set and Point-Set) to find Rich Color Transition Curves that are then used to find objects and targets in images. Again, a line set is a set of consecutive pixels all having the same Target Color ID and containing three pieces of data: the start pixel location of the pixel cluster, the end location, and the Target Color ID. A Transition Point Data-Set (or just Point-Set) consists of four data sections: an ID section, a point location, a backward Line-Set, and a forward Line-Set. The ID section includes a Transition Point ID number, a Transition Curve ID number, a Back-link Transition Curve number, and a row/column indicator. The point location has a search-line number, and the Transition Point location (X) on the search-line. Last two sections are the Rich Color Line-Sets that flank the Transition Point. The location X is defined by a statistical measure of the distance between the nearest start and end locations of the two Line-Sets and any non-Target pixel colors that fall between these locations.

Steps 13 and 14 shows the image being processed along search-lines (rows, columns, etc.) initializing and updating data sets for new image and new search-line. If the new pixel's Rich Color Indicator, S, is the same as it was for the previous pixel then simply update current Line-Set with an end location=j. Otherwise go to step 16, FIG. 21, and create a new Line-Set with the location of the start and end both set to the new pixel location and the Target Color ID set to that of the new pixel. Also, when the Target Color ID changes, begin testing for a Rich Color Transition by checking if there is the start location of the previous Line-Set is within a tolerance distance of another Line-Set further back in the current Search-line such that both have different but non-zero Target IDs. Any Line-Set further away than a distance tolerance, $T_{LD}$, is usually purged from memory to minimize memory requirements. If a Line-Set is found within the distance tolerance, $T_{LD}$, then a Transition Point Data-Set is created or updated. Steps 19 and 20 in FIG. 21 show how a Point-Set of the current search-line can be used to link to Point-Set on a previous search-line to form a Transition Curve and then possibly link up to a previous Transition Curve on the current search-line to identify targets.

FIGS. 22 and 23 show a detailed example of how the method to find a possible Rich Color Transition Curve is applied to a set of pixels on a search-line. This example is similar to Target 910 that is seen in FIG. 9 with the threshold and bias values below:

| | | Thresholds ($T_{1,m}, T_{2,m}, T_{3,m}$) | | | Biases ($B_{1,m}, B_{2,m}, B_{3,m}$) | | |
|---|---|---|---|---|---|---|---|
| a. | R | 1. | .7 | .7 | −10000 | 10000 | 10000 |
| b. | G | .7 | 1. | .7 | 10000 | −10000 | 10000 |
| c. | B | .7 | .7 | 1. | 10000 | 10000 | −10000 |

Step 1—Input (R,G,B)→Step 2—Ratio Space (r, g, b)→Step 3—Rich Color Distance ($A_r, A_g, A_b$)

Step 4—Indicator Flags ($q_r, q_g, q_b$)→Step 5—set Target Color Indicator S

| J | $C_1 = R$ | $C_2 = G$ | $C_3 = B$ | $c_1 = r$ | $c_2 = g$ | $c_3 = b$ | $A_r$ | $A_g$ | $A_b$ | $q_r$ | $q_g$ | $q_b$ |
|---|---|---|---|---|---|---|---|---|---|---|---|---|
| 100 | 159 | 101 | 124 | 1 | 0.635 | 0.779 | 799 | 7447 | 4553 | 0 | 0 | 0 |
| 101 | 185 | 55 | 81 | 1 | 0.297 | 0.438 | 0 | 10027 | 8622 | 1 | 0 | 0 |
| 102 | 179 | 54 | 80 | 1 | 0.301 | 0.447 | 0 | 9983 | 5531 | 1 | 0 | 0 |
| 103 | 189 | 51 | 78 | 1 | 0.27 | 0.413 | 0 | 10302 | 5873 | 1 | 0 | 0 |

-continued

| J | $C_1=R$ | $C_2=G$ | $C_3=B$ | $c_1=r$ | $c_2=g$ | $c_3=b$ | $A_r$ | $A_g$ | $A_b$ | $q_r$ | $q_g$ | $q_b$ |
|---|---|---|---|---|---|---|---|---|---|---|---|---|
| 104 | 187 | 50  | 79 | 1     | 0.267 | 0.422 | 0    | 10326 | 5775 | 1 | 0 | 0 |
| 105 | 105 | 46  | 80 | 1     | 0.438 | 0.762 | 619  | 8619  | 2381 | 0 | 0 | 0 |
| 106 | 70  | 44  | 81 | 0.864 | 0.543 | 1     | 4358 | 9210  | 1642 | 0 | 0 | 0 |
| 107 | 48  | 43  | 81 | 0.593 | 0.531 | 1     | 7074 | 7691  | 0    | 0 | 0 | 1 |
| 108 | 50  | 44  | 83 | 0.53  | 0.53  | 1     | 6976 | 7699  | 0    | 0 | 0 | 1 |
| 109 | 48  | 43  | 84 | 0.512 | 0.512 | 1     | 7286 | 7881  | 0    | 0 | 0 | 1 |
| 110 | 51  | 46  | 87 | 0.529 | 0.529 | 1     | 7138 | 7713  | 0    | 0 | 0 | 1 |
| 111 | 47  | 46  | 85 | 0.553 | 0.541 | 1     | 7471 | 7588  | 0    | 0 | 0 | 1 |
| 112 | 103 | 108 | 99 | 0.954 | 1     | 0.917 | 5630 | 2537  | 6370 | 0 | 0 | 0 |

FIGS. 22 and 23 show how the above pixel data can be used to construct both Line-sets and Transition Point data-sets. A Red data set ending at pixel 104, FIG. 23, is within a tolerance distance of 4 of the Blue data set starting at pixel 107. It is irrelevant that there is a Line-set of non-Target colors between these two. All that matters is that the two are within tolerance of each other and of different but Target Colors. The Transition Point Y value is usually set to the current search-line number. A simple statistical measure of the Transition Point X value is an average of the end pixel number and start pixel number of the two Line-sets respectively. Another measure would be a weighted average of the pixel locations using the original red and blue component values to weight the band of pixels starting at 104 and ending at 107 as shown below:

$$X=[104*(187+79)+105*(105+80)+106*(70+81)+ 107*(48+81)]/[187+79+105+80+70+81+81+81]$$
$$X=105.2$$

The values above are used in FIGS. 22 and 23. In this example, it is assumed that scan-line 23 is the first line that crosses target 910. Thus, the first Transition Point is found at X=103.4 and a Transition Point-Set is created with a Point ID=1 and a Transition Curve ID=1 since these are the first Transition Point and Transition Curve of the image. But since there is no previous Point-Set on this search-line, the Back-link Curve ID=0. Later on the same search-line another Transition Curve is uncovered at X=111.4. This being the second Point found in the image and on a new curve the two IDs here are set to 2. The associated Back-link Curve ID is set to 1 since the Forward Line-Set in the last Point-Set is the same as the backward Line-Set for the new Point-Set (106, 3, 110). With no other Transition Points found in the image, the search-line moves on to search-line 24. Here in FIG. 23 a Transition Point is found at X=105.2 and a new Point-Set is created for Point ID=3. Then look for Point-Sets on the previous search-line that is located within a tolerance of Point ID=3 with the same color pairing. Since Point ID=1 passes both tests, the Curve ID of the new Point-Set is set equal to that of Point ID=1 (i.e. the new Curve ID is set to 1). However, there is no Point-Set to the left of the new Point-Set and so the Back-link Curve ID is set to zero. Later on the same search-line another Transition Curve is uncovered at X=112.4. This being the fourth Point found in the image, the Point ID=4. Searching the previous search line for a Point-Set within tolerance and having the same color pairing leads to setting the new Curve ID to 2. The associated Back-link Curve ID is set to 1 since the Forward Line-Set in the last Point-Set is the same as the backward Line-Set for the new Point-Set (107, 3, 111).

The resulting curves together with their flanking Rich Color patches can be compared to target properties in a target database. By creating a set of Transition Curves, the original problem is reduced to one of comparing a database of target properties to a small set of curves with simple geometric and color properties. The absolute and relative size, and orientation as well as shape and color can be used to detect, identify, locate and orient (in 2D or 3D space), and characterize a set of objects or targets. A sequence of images together with associated database properties can be used to determine physical properties of the objects to which the targets belong. A sequence of video images can be used to define physical properties such as velocity, momentum, acceleration, etc. and further filter the data by enhancing image quality (averaging target data) for targets that have matching characteristics. These characteristics should allow for further tracking refinements and rejection of potential targets that cannot physically change properties radically as seen from frame to frame.

Once a target has been identified along with its geometric and other properties, these can be used with a database and a lookup table to manipulate computer interfaces, computer programs/macros, or devices. Both hardware and software implementations are disclosed. A smart camera with this method implemented in hardware could analyze each frame while the next frame is being acquired and then transmit (wired or wireless) a small data set of Transition Curves only if a target is detected in the frame. This method requires only a small amount of buffer memory and a very few multiples, adds, if tests and bit manipulation per pixel processed. The methods speed and flexibility make it possible to use a variety of targets at the same time. If targets with unique color and geometry are used, then each target that is found can trigger a unique action based on their absolute or relative location and orientation together with their associated database properties.

Description of the Method

The previous U.S. patent application Ser. No. 12/107,092 filed on Apr. 22, 2008 discloses a means of filtering out all but Rich Colors of interest within an image under inspection. The resulting Rich Colored patches can be used to identify and track targets or Rich Colored objects.

In this patent application, the Rich Color methodology is extended and used to replace tracking methods like blob analysis. This is a robust method using a computer or embedded computer chip or specialized camera circuitry to rapidly find the location of a target within an image by searching for Rich Color patches adjacent to each other within a tolerance. This process can be performed in one process as it sweeps across the image one search-line at a time. An image with N color components can have up to N factorial (N!) Rich Color types. In the case of a RGB image (N=3), six possible color types can be identified for a pixel (Red, Green, Blue, Cyan, Magenta, Yellow). The sub-set of color types that are searched for are called Rich Colored Target Colors or just Target Colors. If the color type of the pixel is not a Target Color, the color indicator of the pixel is identified as a "non-Target Color" type. This method searches for Target Color patches different color type that are located adjacent to each other within an input tolerance. The method creates sets of adjacent pixels that have a common color type (including the color type of "non-target color"). The image is processed along search-lines (rows, columns, diagonal lines). Anytime on the same search-line that the end of one such pixel set is located within a tolerance of the beginning of another pixel set from the same search-line and both have different Target Color types, then a Transition Point can be defined. The Transition Point is located along the search-line at a weighted statistical location between the end and the start locations of these two pixel sets. These Transition Points can be strung together forming Transition Curves whose geometric and color properties and proximity to other Curves is used to detect and identify targets and objects of interest as well as locate, orient, and characterize them. This information can then be used to initiate computer applications and determine input data.

The method includes the step of using a distance equation (described in the definitions section) in this Color Ratio Space which is used to determine the presence of any of the N factorial Rich Color types that are used to identify the object or target that is being searched for. For a pixel located I, j the color distance equation is defined as follows in terms of ratio space color component values ($c_1, c_2, \ldots c_N$):

$$A_m = POS(B_{1,m}*(f(c_1)-T_{1,m})) + POS(B_{2,m}*(f(c_2)-T_{2,m})) \ldots + POS(B_{N,m}*(f(c_N)-T_{N,m}))$$

Where, for color component n and color filter type m, $T_{n,m}$ is a color threshold, $B_{n,m}$ is the Bias, $f(c_n)$ is a function of $c_n$ and the function POS (A) such that POS (A)=0 if A is less than or equal to 0, ELSE POS (A)=A. Since only a binary result (zero or non-zero) answer is of interest, the POS functions above can be replaced with traditional IF tests.

Alternatively the method further includes the step of creating a corresponding look-up-table for each primary color and secondary color used in a target capturing an image and subtracting from each pixel in the image the bias of each camera color component apply the ratio space look-up-table to each pixel in the image for each primary and each secondary color used in the target to implement a color filter in this color ratio space to determine the presence of any of the N factorial Rich Color types that are used to identify the object or target that is being searched for.

A robust method using a computer or embedded computer chip or specialized camera circuitry to rapidly find the location of a target within an image by searching for Rich Color patches adjacent to each other within a tolerance.

This method can be implemented on a variety of platforms. It could be developed as a software program running on common personal computers, tablets or smart phones. It could be implemented at a hardware level as a dedicated chip that could be designed-in to hardware systems such as digital cameras. It could be implemented as a stand-alone appliance that could be retro-fitted to existing systems.

The method described herein can be used iteratively on the same data to find the optimal thresholds and bias parameters.

This method can be extended to include more than just the typical three sensor channels (R,G,B). It is likely that digital cameras will soon be commercially available with four sensor channels and cameras with even more channels will be available later in the decade. Furthermore, Security cameras commonly include infrared sensors.

Poor quality data streams (for instance those shot in very low light) could be enhanced to emphasize their rich color characteristics prior to processing by this method in order to allow the processing of data that might otherwise be unusable.

The method further includes the step of setting an indicator for each pixel that identifies the type of Rich Target Color present or the lack of a Rich Target Color.

The method further includes the step of identifying a pixel as having a non-Rich Color if each of its input color components is less than a black tolerance.

The method further includes the step of identifying a pixel as having a non-Rich Color if each of its input color components is above a white tolerance.

The method further includes the step of filtering image data by limiting image data to patches of Target Color that flank each side of a Rich Color Transition Point.

A smart camera with this method implemented in hardware could analyze each frame while the next frame is being acquired and then transmit (wired or wireless) a small data set of Transition Curves only if a target is detected in the frame. This method requires only a small amount of buffer memory and a very few multiples, adds, if tests and bit manipulation per pixel processed. This leads to a blindingly fast method for finding targeted objects in an image. The method's speed and flexibility make it possible to use a variety of targets at the same time. If targets with unique color and geometry are used, then each target that is found can trigger a unique action based on their absolute or relative location and orientation together with their associated database properties.

What is claimed:

1. A method of identifying a target in an image comprising the steps of:
   using a computer processor to perform the steps of:
   defining a ratio color space determining the largest color component value for each pixel in an image;
   testing each pixel for the presence of a rich target color;
   finding at least two pixels of different rich color types separated by a tolerance; and
   using the at least two pixels to locate a target in the image.

2. The method of claim 1 further comprising:
   defining patches of contiguous pixels that have a common rich target color type;
   finding two patches that are of two different target rich color types separated by less than an input tolerance;
   for such two patches, defining a rich transition point location on the search-line at a mid-point between the two patches;
   forming a transition curve by linking up all rich transition points in all search lines that are located within an input tolerance of each other with identical flanking rich target colors; and
   finding transition curves from the same target by searching for transition curves that share the same flanking rich target color types.

3. The method of claim 1 further comprising:
   developing a color filter including the step of setting a rich target color indicator to a non-target color type for any pixel that has all of the original color components darker than a lower threshold or all lighter than an upper limit threshold.

4. The method of claim 1 further comprising:
   developing a color filter including the step of setting a rich target color indicator to black or white color type for any pixel that has all of the original color components darker than a lower threshold or all lighter than a upper limit threshold, respectively.

5. The method of claim 2 further comprising:
   repeating the process along a new search line that is perpendicular to a first search line and combining the rich transition point locations to be added to the set from a previous pass search line.

6. The method of claim 1 further comprising:
developing a color filter including the step of displaying rich target color pixel sets that were used to define a transition point.

7. The method of claim 1 further comprising:
repeating the process through a sequence of 2-D images in time as one of a video and a 3-D spatial image along a search line that is perpendicular to each image and combining the transition points can form a 3-D transition surface formed by the transition points and 3-D transition curves.

8. The method of claim 1 further including:
using a color distance equation for each pixel located at I, j, the color distance equation defined in terms of ratio space color component values $(c_1, c_2, \ldots c_N)$:

$$A_m = POS(B_{1,m}*(f(c_1)-T_{1,m})) + POS(B_{2,m}*(f(c_2)-T_{2,m})) \ldots + POS(B_{N,m}*(f(c_N)-T_{N,m})),$$

where, for color component n and color filter type m, $T_{n,m}$ is a color threshold, $B_{n,m}$ is the Bias, $f(c_n)$ is a function of $c_n$ and the function POS (A) such that POS (A)=0 if A is less than or equal to 0, ELSE POS (A)=A.

9. The method of claim 1 further comprising:
creating a corresponding look-up-table for each primary color and secondary color used in a target; and
capturing an image and subtracting from each pixel in the image the bias of each camera color component applying a ratio space look-up-table to each pixel in the image for each primary and each secondary color used in the target to implement a color filter in the color ratio space to determine the presence of any of the N factorial rich color types that are used to identify the target.

10. The method of claim 1 further comprising:
using a processor to find the location of a target within an image by searching for rich color patches adjacent to each other within a tolerance.

11. The method of claim 1 further comprising:
using more sensor components beyond red, green and blue color sensors.

12. The method of claim 1 further comprising:
enhancing poor quality data streams to emphasize rich color characteristics.

13. The method of claim 1 further comprising:
setting an indicator for each pixel that identifies the type of rich target color and the presence or the lack of a rich target color.

14. The method of claim 1 further comprising:
identifying a pixel as having a non-rich color if each of its input color components is less than a black tolerance.

15. The method of claim 1 further comprising:
identifying a pixel as having a non-rich color if each of its input color components is above a white tolerance.

16. The method of claim 1 further comprising:
filtering image data by limiting image data to patches of target color that flank each side of a rich color transition point.

17. The method of claim 1 further comprising:
using transition curves to identify targets in an image.

18. The method of claim 1 further comprising:
using transition curves and database information to determine physical properties of targets in image data.

19. The method of claim 1 further comprising:
transition curves and database information to identify targets in multidimensional image data.

20. The method of claim 1 further comprising:
associating multiple adjacent curves with a given target.

21. The method of claim 1 further comprising:
associating a path and geometric properties, a speed, and acceleration of the transition curves in the sequence of video frames to trigger use of a predefined computer program and a specific data base entry to be used with the predefined computer program.

* * * * *